United States Patent [19]
Bartell

[11] Patent Number: 4,514,639
[45] Date of Patent: Apr. 30, 1985

[54] BLACKBODY SIMULATOR WITH UNIFORM EMISSIVITY

[76] Inventor: Frederick O. Bartell, 2636 W. Calle Puebla, Tucson, Ariz. 85745

[21] Appl. No.: 502,004

[22] Filed: Jun. 7, 1983

Related U.S. Application Data

[63] Continuation of Ser. No. 340,808, Jan. 19, 1982, abandoned, which is a continuation-in-part of Ser. No. 163,305, Jun. 26, 1980, Pat. No. 4,317,042.

[51] Int. Cl.³ .............................................. G21G 4/00
[52] U.S. Cl. ............................... 250/493.1; 250/504 R
[58] Field of Search ...................... 250/493.1, 503, 504; 313/110

[56] References Cited

U.S. PATENT DOCUMENTS 3,275,829  9/1966  McClane et al. ............... 250/493.1
3,419,709  12/1968  De Bell ............................ 250/493.1
3,699,343  10/1972  Stein et al. ...................... 250/493.1
4,317,042  2/1982  Bartell ............................ 250/493.1

OTHER PUBLICATIONS

Gerald Falbel, et al. Contemporary Infrared Standards and Calibration, "Radiometric Calibration for the Earth Radiation Budget Experiment Instruments", Vol. 308, Aug. 25-26, 1981, (SPIE) Pgs. 122-134.

Primary Examiner—Bruce C. Anderson
Attorney, Agent, or Firm—Spensley, Horn, Jubas & Lubitz

[57] ABSTRACT

A blackbody simulator which includes a core having a non-spherical cavity and an aperture to the cavity. A substantial portion of the cavity surface is shaped so that the value of the projected solid angle of the aperture with respect to any point of the cavity surface portion is approximately constant.

44 Claims, 13 Drawing Figures

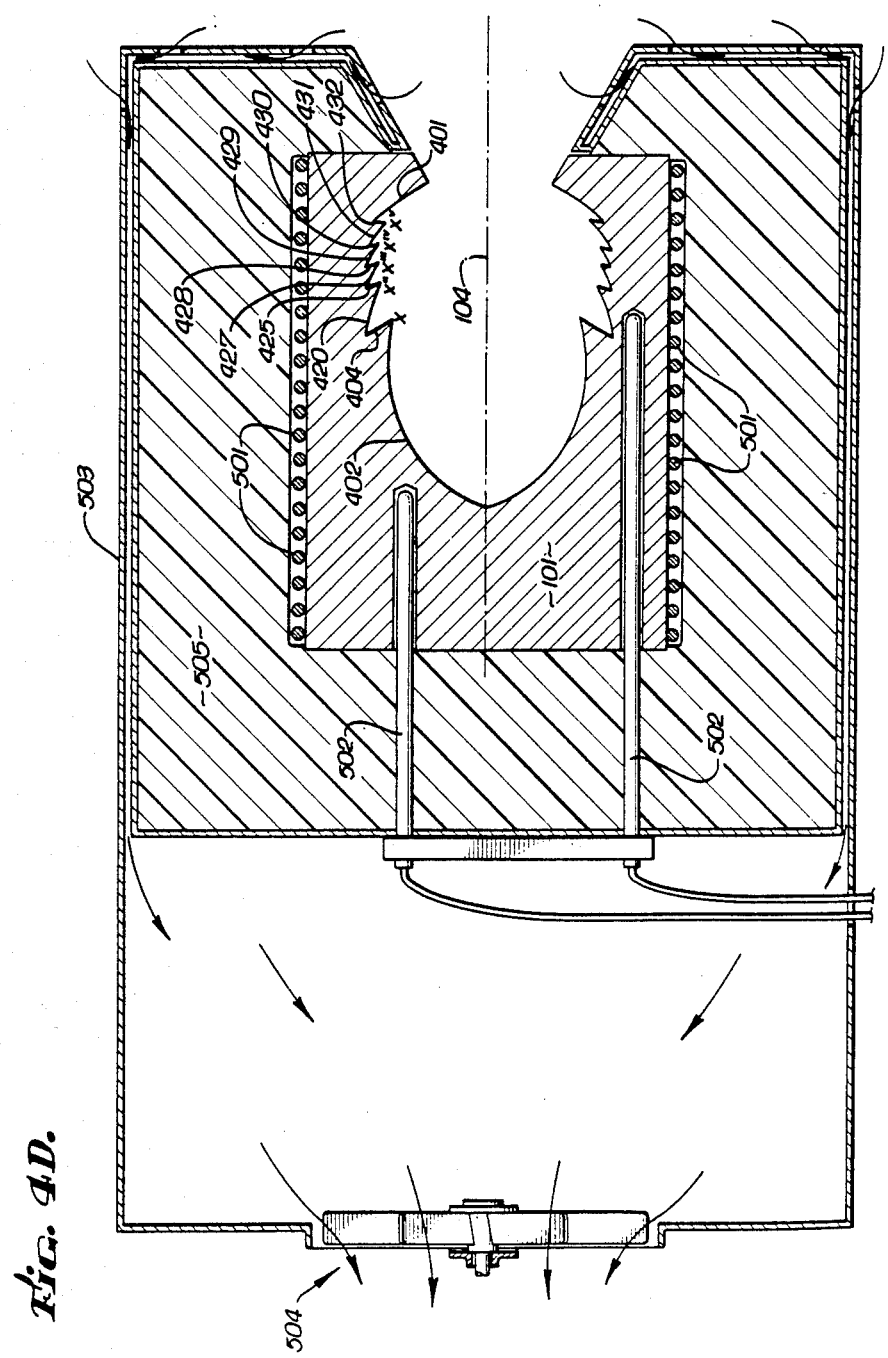

BLACKBODY SIMULATOR WITH UNIFORM EMISSIVITY

BACKGROUND OF THE INVENTION

1. Related Application

This is a continuation of application Ser. No. 06/340,808, filed on Jan. 19, 1982, abandoned.

The present application is also a continuation-in-part of co-pending application, Ser. No. 163,305, filed June 26, 1980 now U.S. Pat. No. 4,317,042.

2. Field of the Invention

The invention relates to blackbody simulators, and more particularly to such simulators having a core with an aperture to an interior cavity, the aperture simulating the properties of a similarly sized and shaped blackbody.

3. Description of the Prior Art

A blackbody is an idealized object which would absorb all electromagnetic radiation impacting it. Since such an object would absorb all light striking it, it would appear black. The physical properties of blackbodies have been intensively studied. Although the definition of a blackbody is in terms of its perfect absorption of electromagnetic radiation, its most interesting properties are associated with its radiated energy. When considered as a radiation source, it is generally considered to be heated to increase its radiated energy. The total emission of radiant energy from a blackbody is expressed by the Stefan-Boltzmann law, which states that the total electromagnetic emission of a blackbody is proportional to the fourth power of its absolute temperature. The spectral energy distribution of the radiant energy emitted by a blackbody is expressed by Planck's radiation formula. Planck's radiation formula indicates that a blackbody which has a temperature between 50 degrees Kelvin and 3,000 degrees Kelvin will emit electromagnetic radiation principally in the infrared region. This temperature range encompasses the temperatures at which most nonnuclear physical phenomena occur.

A blackbody is an idealized concept. A blackbody simulator is an apparatus designed to simulate the physical properties of the idealized blackbody. A blackbody simulator is of great use in infrared research and development and manufacturing. For instance, it may be used to provide a source of infrared radiation of a known signal level and a known spectral distribution. It may be used to provide a source of infrared radiation for the adjustment or testing of infrared components, assemblies or systems. Another use for blackbody simulators is as a near perfect absorber of infrared radiation.

Intuitively, it would appear that a blackbody simulator would be merely any black object. Such simulators have been used in the past, but their correspondence to a true blackbody has been poor. The best blackbody simulators are formed by creating a cavity in a core material, the cavity forming an aperture on a side of the core. The aperture is used to simulate a flat blackbody having the shape and size of the aperture. Particular cavity shapes are chosen to cause multiple reflection and eventual absorption of any electromagnetic energy entering the aperture.

One measure of the closeness by which a blackbody simulator approaches a true blackbody is its emissivity. The emissivity of an isothermal surface is the ratio of the radiation emitted by the surface to the radiation emitted under identical conditions by a blackbody having the same shaped surface and temperature. Unless the blackbody simulator is luminescent, the emissivity of an isothermal blackbody simulator is less than one.

If the cavity surface coating of a blackbody simulator has an emissivity above 0.7, most cavity shapes in commercial use in blackbody simulators will result in a device in which the on-axis emissivity of the aperture will exceed 0.99.

The angular distribution of radiation from a perfectly diffuse radiator, such as a blackbody, is given by the Lambert cosine law. This law states that the signal level of radiation from a perfectly diffuse surface is proportional to the cosine of the angle between the direction of emission and a normal to the surface. Accordingly, the Lambert cosine law provides a standard against which the uniformity of emission from a blackbody simulator can be compared against a blackbody.

It is well known how to manufacture a blackbody simulator with a cavity shape configured to have an on-axis emissivity very close to one. There are commercially available blackbody simulators with an on-axis emissivity of 0.9997. Unfortunately, the prior art cavity shapes for high emissivity blackbody simulators have been found to not provide the uniformity of emission specified by the Lambert cosine law. Such uniformity of emissivity is becoming a significantly more important consideration in current infrared research and development. It appears that the uniformity of blackbody simulator emissivity will become a significantly more important consideration in future manufacturing adjustments and tests of infrared components, assemblies and systems.

For instance, infrared viewing systems have been the subject of intensive research and development. Initially, a single element infrared sensor was used with a two axis mechanical scanner to provide a two dimensional infrared picture. For calibration and testing of such single elements, a blackbody simulator was used to illuminate a relatively narrow field of view. Since a single element infrared sensor was used, uniformity of emissivity was not as important as it is today. However, infrared viewing systems now in development use a one dimensional or two dimensional array of infrared sensors, thereby eliminating the need for one direction or both directions of mechanical scanning. Testing and calibration of such array detector systems require a blackbody simulator which has an emissivity which is uniform over the appropriate angular field of view.

Although emissivity and uniformity of emissivity are important specifications for a blackbody simulator, such simulators also are developed with other very practical considerations in mind.

Key specifications for a blackbody simulator to be used as a source of infrared emission include aperture size and temperature range. The cost of a black body simulator is in large part determined by the physical size and weight of the blackbody simulator. The cost is also affected by the particular cavity shape used inasmuch as certain cavity shapes are more expensive to manufacture.

The radiation properties of a cavity type blackbody simulator are determined by the size and shape of the cavity and the temperature, material and texture of the cavity walls. Most commercially available blackbody simulators have a cavity shape based upon a cone. Other popular shapes are the sphere, the reentrant cone and the cylinder. A reentrant cone cavity has a shape which is formed by placing base to base two circular cones having the same size base, and truncating the apex of one of the cones to form the aperture. Both a conical cavity and reentrant cone cavity have a conical apex opposite the aperture.

An advantage to a blackbody simulator having a spherical cavity is that its emissivity is very uniform. Further, it has been theoretically proved and experimentally verified that the surface of a spherical cavity tends to become isothermal, i.e., the cavity surface temperature tends to become uniform. It is desirable for the surface of the cavity to be as nearly as possible isothermal since that property is necessary for the spectral distribution of the simulator to conform to the Planck radiation formula. Despite these advantages, a spherical blackbody simulator is a large object, and is correspondingly very heavy. In addition, its on-axis emissivity can be achieved by considerdly smaller blackbody simulators having conical or reentrant cone cavities. Another disadvantage to a blackbody simulator using a spherical cavity is specular reflection from the cavity wall opposite the aperture. Radiation entering the aperture on-axis tends to be reflected out the aperture, rather than be absorbed. Such specular reflections are antithetical to the definition of a blackbody. This latter deficiency of a spherical cavity blackbody simulator is sometimes overcome by using a tilted or off center arrangement for the sphere and the core, but this technique requires even larger and heavier assemblies.

Blackbody simulators having a generally cylindrical cavity shape, with the aperture in one axial end of the cylinder, are easy to manufacture. Some cylindrical cavities have been provided a concentrically grooved back plate where the grooves have a generally uniform saw tooth cross-section, such as that shown in De Bell, U.S. Pat. No. 3,419,709. Unfortunately, cylindrically shaped blackbody simulators have lower on-axis emissivity than a cone, and they have poor uniformity of temperature and poor uniformity of emissivity.

Most commercial blackbody simulators have a cavity shape which is either a cone (such as that shown in McClune, et al., U.S. Pat. No. 3,275,829) or reentrant cone (such as that shown in Stein, et. al., U.S. Pat. No. 3,699,343). Such shapes have excellent on-axis emissivity. Specifically, the apex of the cone opposite the aperture has emissivity much greater than that of a sphere with a diameter such that the wall of the sphere opposite the aperture would be at the same distance from the aperture as that of the apex of a cone or a reentrant cone. A blackbody simulator having a cone as a cavity shape is relatively easy to manufacture, except for the apex, but it has poor uniformity of emission. The reentrant cone is more difficult to manufacture, but the advantage of a reentrant cone over a simple cone is that the surface of the cavity maintains a more uniform temperature and emissivity than that of a similar sized cone, since a reentrant cone cavity tends to minimize the cooling of the cavity near the aperture.

It is an object of the invention to provide a cavity type blackbody simulator that has the high on-axis emissivity obtained with cone or reentrant cone blackbody simulators, yet also approaching the uniform emissivity obtained with spherical blackbody simulators. Another object of the invention is to provide a compact blackbody simulator which is shorter and smaller in diameter than a blackbody simulator having a spherical cavity with the same emissivity. Yet another object of the invention is to provide a blackbody simulator with a cavity having a shape which tends to take a uniform temperature when heated. A further object of the invention is to provide a method for the design of a blackbody simulator cavity having a specified maximum depth, diameter, and aperture size in which high emissivity and uniformity of emissivity are obtained.

SUMMARY OF THE INVENTION

These and other objects of the herein disclosed invention are provided by a blackbody simulator having a cavity shaped to insure that the value of the projected solid angle of the aperture is constant or approximately constant when viewed from all points on the cavity surface, or alternately, when viewed from all points on the primary radiating surface of the cavity. The primary radiating surface of a blackbody simulator cavity with respect to an object outside the cavity is the portion of the cavity surface which is in direct line of sight to some portion of the object.

The projected solid angle of one surface as viewed from a second surface is proportional to the fraction of the total amount of radiant energy leaving the second surface that impinges on the first surface.

In one embodiment, the cavity shape is determined by assuming that the aperture is sufficiently small so that it would be unnecessary to perform an integration over the aperture to compute the projected solid angle, thereby simplifying the calculations necessary to determine the cavity shape. For an apex half angle less than 60 degrees, a suitable cavity shape is described which has a cross-sectional shape described by a smoothly curved line forming a half angle at the aperture of approximately one half the apex half angle. The maximum cross-sectional radius of this embodiment is generally reached at approximately 58% of the distance from the aperture to the apex.

In another embodiment, the cavity determined by the above described embodiment is truncated near the aperture end to form a larger aperture. For instance, the diameter of the aperture formed by the truncation may be approximately one half of the maximum cross-sectional diameter of the cavity.

In another embodiment, numerical integration techniques have been used to determine a series of cavity shapes which maintain essentially constant the projected solid angle of a circular aperture with respect to each portion of the cavity surface. The simplest shape is formed by three smoothly arcuate subsurfaces. The first subsurface forms a cone-like apex opposite the aperture, the subsurface smoothly curving as it approaches the aperture until its tangent intersects the aperture. The second subsurface starts from the rim of the aperture and proceeds toward the apex; it is a portion of the surface of a sphere. The third subsurface arcuately joins the two previously described subsurfaces. In another embodiment, the three subsurfaces of the above described embodiment are identified. Then the second and third subsurfaces are interrupted at some specified maximum distance off axis. The second and third subsurfaces are then connected by a series of subsurfaces that appear in cross-section somewhat like a tilted sawtooth shape. These subsurfaces are all maintained with an off axis distance less than or equal to the specified maximum off axis distance; and the surface details of these subsurfaces are all determined so that the projected solid angle of the aperture as seen from all points on all these subsurfaces is contant and equal to the projected solid angle of the aperture as seen from all points on the first, second and third subsurfaces.

In the embodiment just described, the multiple subsurfaces are maintained with a specified maximum off-axis distance, and these multiple subsurfaces are located on the side walls of the cavity. In another embodiment, these multiple subsurfaces begin at the apex and carry around from the apex to the aperture.

If the inventive blackbody simulator is to be used to subject a specific utilization apparatus or volume or area to electromagnetic flux, the cavity surface may be modified for ease of manufacturing in any of a number of ways that will insure that the primary radiating surface of the cavity with respect to the utilization object or volume or area is a surface in which the projected solid angle of the aperture with respect to each point on the primary radiating surface remains essentially contant. Other portions of the cavity surface may be shaped to reduce the size, weight, and cost of the blackbody simulator.

BRIEF DESCRIPTION OF THE DRAWINGS

FIGS. 4A–4D illustrate cross-sections of embodiments of the invention in which by numerical integration the projected solid angle of a finite sized aperture is held constant with respect to the primary radiating surface of the cavity for FIG. 4B and with respect to all points on the cavity surface for FIGS. 4A, 4C and 4D.

DESCRIPTION OF PREFERRED EMBODIMENTS

Although the radiation properties of a blackbody are well defined by the earlier mentioned Stefan-Boltzmann law and Planck radiation formula, the radiation properties of blackbody simulators are not so tidily summarized. Numerous articles have been published which attempt to describe or define the radiation of a blackbody simulator having a specified cavity shape. In order to reach any useful conclusions, numerous simplifying assumptions are made in the published theories of blackbody simulators. In general, the theoretical studies of blackbody simulators have used as a figure of merit for a blackbody simulator its on-axis emissivity. More recent theoretical studies, such as "Emissivity of Isothermal Spherical Cavity with Gray Lambertian Walls", by F. E. Nicodemus, *Appl. Opt.*, Vol. 7, No. 7, pps. 1359–1362, July, 1968, have been concerned with the angular uniformity of emissivity of a blackbody simulator. Experimental studies of blackbody simulators having cavity shapes which are spherical, conical, or cylindrical have demonstrated that the commonly used conical and cylindrical cavity shapes do not have the angular uniformity of emissivity which a true blackbody would have. Such experimental work is described, for instance, in "Cavity Radiation Theory" by F. O. Bartell and W. L. Wolfe, *Infrared Physics,* 1976, Vol. 16, pps. 13–24.

As described in this second paper, the experimentally measured non-uniformity of emission of blackbody simulators may be explained by considering the effect of the projected solid angle formed by the aperture with respect to the cavity surface.

Experimental and theoretical studies have demonstrated that for a given cavity depth, i.e., distance along a perpendicular to the aperture to the furtherest position of the cavity surface, a spherical cavity will have lower but more unifrom emissivity than a concial cavity when both are used as blackbody simulators.

The inventive cavity shapes for blackbody simulators are based on the concept that opposite the aperture a conical apex will provide high emissivity, and that this high emissivity can be maintained across other positions of the cavity surface by a cavity surface which is shaped to assure that the projected solid angle of the aperture with respect to each portion of the cavity surface takes the same value as it does at the apex. Standard numerical integration techniques have been used to determine cavity shapes for a family of blackbody simulator cavities in which uniformily high emissivity may be expected.

There are two concepts of principal importance in the description of the inventive blackbody simulator cavities. They are that of the projected solid angle and that of a primary radiating surface for a cavity.

Figure 1:
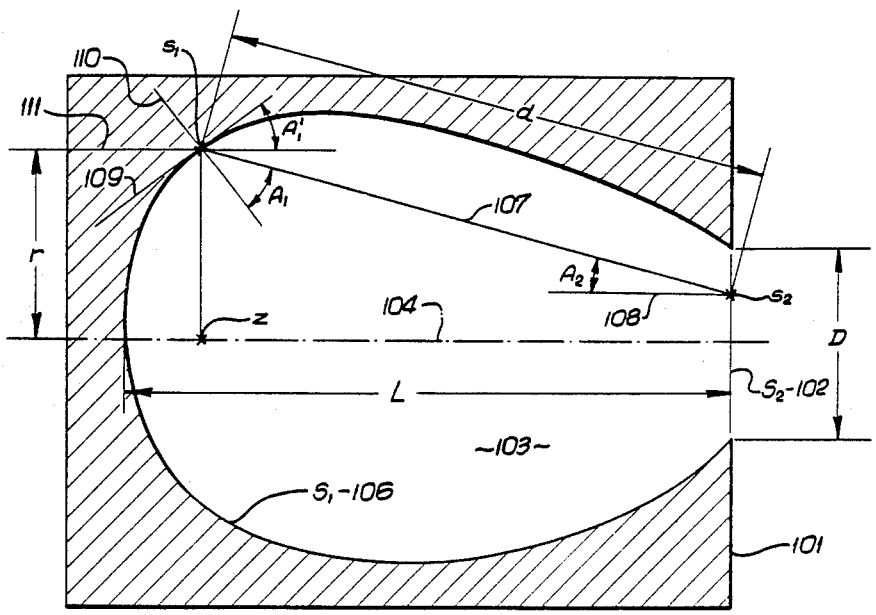
FIG. 1 is a diagrammatic cross-section of the cavity of a blackbody simulator, illustrating the geometrical aspects involved in defining the projected solid angle of a small area on the aperture with respect to a point on the cavity surface.

FIG. 1 diagrammatically illustrates a cross-section of a blackbody simulator core 101. The core 101, as will be described in more detail below, is of a material such as metal, graphite, or ceramic which may withstand the temperatures to which it will be heated to generate the desired radiation. On one side of the core 101 is an aperture 102 to an interior cavity 103. For minimum size, weight, complexity, and costs, cavities in blackbody simulators generally have rotational symmetry or are composed of subcavities which are each rotationally symmetrical. There are exceptions to this general rule of axial symmetry. For example the core or cavity of a spherical cavity blackbody simulator may be oriented in a tilted or off center way so the total system optical axis intersects the back wall of the sphere at a nonperpendicular angle. The aperture 102 is typically a circle, although other aperture shapes may be easily provided for by placing a suitable plate having a cut-out of the desired shape in the aperture or in front of the aperture.

Aperture 102 has diameter D. Line 104 is the axis of rotational symmetry of the cavity 103. L is the depth of the cavity as measured along the rotational axis 104 from the aperture 102.

Such a blackbody simulator provides apparent blackbody radiation from the aperture 102 as though it were a true blackbody located at the aperture and having the shape and size of the aperture 102. (Of course, a true blackbody radiates energy in all directions, unlike a blackbody simulator cavity which radiates simulated blackbody radiation only within a limited angular field measured from the rotational axis 104).

The projected solid angle may be described as follows. Let $S_1$ designate the surface 106 of the cavity 103, with $s_1$ a point on $S_1$. Let the figure formed by the aperture 102 be designated $S_2$ and let a point on $S_2$ be designated $s_2$. Let $d = d(s_1, s_2)$ be the length of the line 107 between $s_1$ and $s_2$. Let r be the distance from $s_1$ to line 104, and let z be the point on line 104 at which a perpendicular to line 104 will intersect $s_1$. Line 109 is the tangent to the cavity surface 106 at $s_1$. Line 110 is the normal to the cavity surface 106 at $s_1$. Line 108 is the normal to the aperture 102 at $s_2$. Let $A_1$ be the angle formed between lines 107 and 110, and let $A_2$ be the angle formed between lines 107 and 108.

The projected solid angle of the aperture 102 with respect to point $s_1$ on $S_1$ is given by the formula $$\int_{S_2} \frac{\cos(A_1)\cos(A_2)}{d^2} dS_2 \quad (1)$$

As is well known, the projected solid angle of a second surface with respect to a first surface is proportional to the fraction of the total amount of radiant energy leaving the first surface that impinges on the second surface. If a uniform cavity surface is at a uniform temperature, i.e., the surface is isothermal, and if the projected solid angle of the aperture with respect to any portion of the cavity surface is constant, the radiation from each cavity surface portion through the aperture will also be constant. Therefore, such a uniformly heated cavity surface will tend to stay at a uniform temperature since each portion of the cavity surface will suffer the same energy loss through the aperture.

Figure 2:
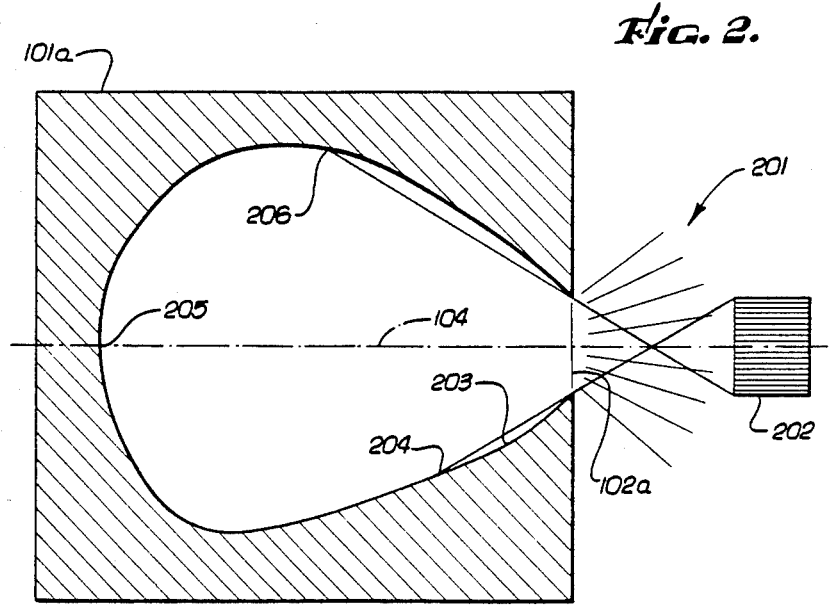
FIG. 2 is a diagrammatic cross-section of a blackbody simulator similar to FIG. 1, illustrating the primary radiating surface of the cavity surface with respect to an object or volume or area which will utilize radiation emitted from the aperture.

FIG. 2 illustrates the concept of a primary radiating surface for a blackbody simulator cavity. In FIG. 2, a blackbody simulator core 101a is shown in crosssection. The blackbody simulator is assumed to be used to radiate electromagnetic radiation 201 from the aperture 102a onto some utilization object or volume or area 202. For instance, the blackbody simulator may be providing infrared radiation to an infrared optics system. The primary radiating surface of the cavity surface 203 is that portion of the cavity surface 203 which is in direct line of sight through the aperture 102a to some portion of the utilization object or volume or area 202. In FIG. 2, this would include that portion of the cavity surface 203 from point 204 around to the rear 205 of the cavity surface to point 206. The primary radiating surface of a cavity is therefore that portion of the cavity surface which may directly radiate enery onto some portion of the utilization object or volume or area 202.

The importance of the concept of the primary radiating surface is that it is this portion of a blackbody simulator cavity surface which principally determines the emissivity and uniformity of emissivity of the blackbody simulator. If it is known what uses would be made of a blackbody simulator, i.e., what the utilization objects will be, and their planned distances from the aperture of the blackbody simulator, the inventive blackbody simulator cavity shapes may be designed to provide the desired high emissivity and uniformity of emissivity, as may be measured at the utilization objects. As is clear from FIG. 2, the closer a utilization object or volume or area 202 approaches the aperture, the larger the primary radiating surface will be. If it is not known what use will be made of a blackbody simulator, then a larger primary radiating surface will provide a device with greater versatility.

Inasmuch as the inventive cavity shapes are rotationally symmetrical about an axis, in order to describe the cavity shapes, it is sufficient to specify a process for determining a radius of the cavity at all positions on the rotational axis. Therefore, the inventive cavity shapes will be described in terms of a two dimensional graph of a function which, if "rotated" about the rotational axis will form the inventive cavity shape.

The inventive cavity shapes have not been susceptible to description by a mathematical formula. Numerical approximation techniques have been used to determine the cavity shapes.

Each of the inventive cavity shapes will be described in terms of a "normalized form" which assumes that the depth of the cavity is unity and the diameter of the aperture is D. Proportional reduction or expansion of a normalized cavity shape will allow manufacturing of a cavity of any arbitrary depth.

Each of the inventive cavity shapes has a conical apex opposite the aperture. $A_0$ will be used to designate the apex half angle, i.e., the angle formed between the axis of rotational symmetry and the tangent to the cavity surface at the apex. As is well known, a conical apex in a rotationally symmetrical blackbody simulator cavity generates high emissivity along the axis of symmetry. The inventive cavities will be shaped so that the high emissivity of the apex will be uniformly generated by all portions of the cavity surface or at least those portions which directly radiate energy onto utilization objects.

As with the cavity in most commercial black body simulators, the inventive cavity shapes are rotationally symmetrical and are for use with a circular aperture. It will be obvious to one skilled in the art that the methods to be described below can be extended to define cavity shapes terminating in any arbitrary shape aperture. However, the practical difficulties in manufacturing cavities according to the teachings of the invention which will have a non-circular aperture tend to discourage production of blackbody simulators with such apertures. The conventional approach to providing a simulator for a non-circular blackbody is to insert a plate having a suitably shaped cut-out between a blackbody simulator having a circular aperture and whatever apparatus will be subjected to the radiation emitted from the blackbody simulator or alternatively to place such a plate in the cavity aperture.

The apex half angle is a fundamental parameter in the definition of a specific cavity shape. Each of the embodiments of the invention described below define a family of cavity shapes which have as one of its parameters the apex half angle. The choice of a particular apex half angle for a cavity is made in part by reviewing the shapes which result from that choice to determine if the resulting maximum radial cross section will result in a blackbody simulator having an acceptable size and weight for the intended purposes.

Figure 3:
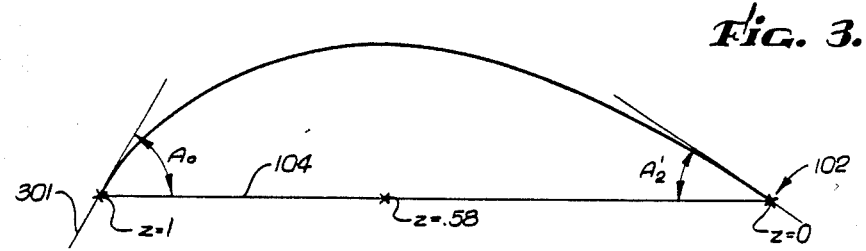
FIG. 3 is a graph of a curve defining the surface of a rotationally symmetrical cavity of a preferred embodiment in which the size of the aperture is assumed to be very small with respect to the axis of symmetry.

FIG. 3 is a graph of a function illustrating one of the "small aperture" embodiments of the inventive blackbody simulator cavity shapes. As discussed above, it is assumed that the axis of symmetry 104 is one unit long, with z=0 at the aperture 102 and z=1 at the apex end.

The small aperture cavity shapes are determined by assuming that the aperture 102 is sufficiently small with respect to the length of the axis of symmetry 104 so that the integral specified in Equation 1 may be simplified by assuming that for each point $s_1$ on $S_1$, the quantities $A_1$, $A_2$, and d will be effectively constant during the integration over $S_2$.

As mentioned, the inventive cavity shapes are based on the concept that maximum uniform emissivity should be generated by a cavity shape in which the projected solid angle of the aperture with respect to points on the primary radiating surface of the cavity is held constant. The small aperture embodiments assume the entire cavity surface is the primary radiating surface.

Using the mathematical terminology previously introduced (summarized in TABLE 1), under the simplifying small aperture assumption, at the apex, the projected solid angle of the aperture 102 will be $$\int_{S_2} \frac{\cos(90° - A_0) \cos(0°)}{l^2} dS_2 \quad (2)$$

since the aperture 102 is perpendicular to the axis of symmetry 104. Therefore, since the projected solid angle of the aperture as seen from all cavity surface locations is a constant, then with respect to any other point $s_1$, the projected solid angle of the aperture will be $$\int_{S_2} \sin(A_0) dS_2 = \int_{S_2} \frac{\cos(A_1) \cos(A_2)}{d^2} dS_2 \quad (3)$$

Assuming $A_1$, $A_2$, and d will not vary during the integration over $S_2$ leads to the following simplification of Equation (3):

$$\sin(A_0) = [\cos((A_1) \cos (A_2)]/d^2 \quad (4)$$

Further, under our simplifying assumption, $d^2 = z^2 + r^2$.

Let line 111, shown in FIG. 1, be parallel to the axis of symmetry 104 and pass through $s_1$. Let $A'_1$ be the angle formed between lines 111 and 109, i.e., the angle of the tangent at $s_1$ with respect to the axis 104. Then $A'_1 + A_1 + A_2 = 90°$. After further observing that $A_2 = \arctan(r/z)$, Equation 4 can be further simplified to:

$$\sin(A_0) = \frac{\cos\left(\arctan\left(\frac{r}{z}\right)\right) \sin\left(A_1' + \arctan\left(\frac{r}{z}\right)\right)}{r^2 + z^2} \quad (5)$$

Equation 5 is an equation which is susceptible to solution by numerical approximation techniques. At the apex, $r=0, z=1$, and $A'_1 = A_o$. An arbitrary set of points on the axis of symmetry 104 is chosen for which the corresponding cross-section radius will be computed. For instance, assume the cross-sectional radius will be determined for $z=1.00, 0.99, \ldots, 0.01, 0.00$. Starting at the apex, i.e. $z=1.00$, the tangent specified by $A'_1$ is followed up until it intersects the line perpendicular to the axis of symmetry determined by $z=0.99$, thereby determining a tentative corresponding value for r when $z=0.99$. $A'_1$ at $z=0.99$ may be computed by use of Equation 5.

To improve the accuracy of the curve which satisfies Equation 5, the value of $A'_1$ which was computed should be averaged with $A_0$ and from this average, a second r value is determined for $z=0.99$. From this second r value a second $A'_1$ value can be computed. This second $A'_1$ value should now be averaged with $A_o$, and from this new average, a third r value is determined for $z=0.99$. This iterative process should be repeated several times to improve the numerical accuracy of the r and $A'_1$ values for $z=0.99$. which satisfy Equation 5.

The values of r and $A'_1$ when $z=0.98$ is determined in a similar manner from the values of $A'_1$ and r for $z=0.99$. Continuing this process in sequence for each of the chosen points on the axis defines a curve as shown in FIG. 3.

Table 2 lists the values of an embodiment of the invention determined with respect to the small aperture assumption when the apex half angle is 30 degrees. All cavity shapes determined by the described method have resulted in very small r when $z=0$, with smaller r for smaller values of $A_o$. When $A_o$ has been 20° or less, it has been $r=0.0\pm0.00001$ when $z=0.0$; and when $A_o$ has been as large as 88°, it has been $r=0.0\pm0.001$ when $z=0.0$.

Table 3, lists the maximum cross-sectional radii and corresponding z values which have been determined for various apex half angles. $A'_2$ is the aperture half angle, i.e., the angle formed with respect to the axis of symmetry 104 by the tangent to the cavity surface $S_1$ where it meets the aperture, i.e., $z=0$.

As indicated in Table 3, the inventive small aperture cavity shapes are characterized by having $A'_2$ approximately $-A_0/2$ and the maximum cross sectional radius occurring near $r=0.58$ if $A_0$ is not greater than 60 degrees. As shown in FIG. 3, the small aperture cavity embodiments have a smooth shape, except at the apex and aperture.

The cavity shapes determined by the above described process are not of practical interest unless an aperture of useful size is provided, so that radiation may be emitted.

Satisfactory results may be expected by truncating the curve defining the cavity at z between 0.01 and 0.31, and possibly at higher values, to form the aperture. Analogizing to the most popular designs for reentrant cone cavities, the preferred embodiments of the inventive small aperture cavities will truncate the curve at the point near the aperture that will result in an aperture radius which will be approximately ½ the maximum cross-sectional radius.

Figure 4A:
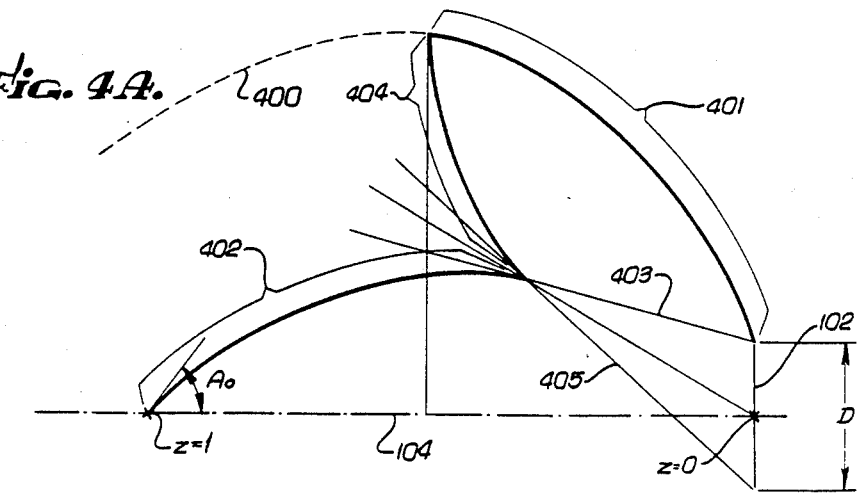

Use of a more sophisticated numerical approximation technique, in which the integration over $S_2$ is approximated by a finite sum, allows determination of other inventive cavity shapes without the necessity of the small aperture assumptions which led to Equation 5. FIG. 4A is a cross-section of an illustrative cavity shape of a "three surface" finite aperture embodiment of the invention in which the integral over $S_2$ is computed in determining the aperture's projected solid angle with respect to points on the cavity surface $S_1$.

As previously discussed, it is assumed that the aperture is circular with diameter D.

Numerical integration techniques approximate an integral over a surface by a finite sum, each term of the sum approximating the integral over a small portion of the surface. In the present invention, the surface $S_2$ of the circular aperture has been approximated by several grids of elements. The more elements in this grid (i.e., the finer the grid), and the more closely the grid approximates $S_2$, the more accurate the approximation to the projected solid angle of the aperture with respect to points on the cavity surface $S_1$.

Table 4a lists the x-y coordinates for the centers of a set of 57 squares which form a grid approximating a circular aperture with diameter $D=8.52$. Each square will have area 1. In order to compute the projected solid angle of $S_2$ with respect to a point $s_1$ on $S_1$, the integrand of Equation 1 is computed with respect to the centers of each of the squares. It is assumed that the values of $A_1$, $A_2$, and d will not significantly vary over the small grid elements, and that therefore the projected solid angle of the aperture will correspond to the sum over the 57 squares.

Although Table 4a lists the coordinates for a grid of 57 squares approximating a circular aperture with $D=8.52$, the coordinates of this grid may be scaled to approximate a circle with diameter $D'$ by merely multiply each x and each y coordinate by $D'/8.52$.

Table 4a should not be construed to imply that preferred embodiments of the invention would have $L/D=1/8.52$. In actuality, useful cavity shapes have an L/D ratio of from less than 1/1 to more than 50/1 with most ratios between about 2/1 and 10/1. Table 4a is only meant to specify the manner in which a circular aperture may be approximated by a grid of elements. The coordinates of the grid elements of Table 4a may be scaled as necessary to provide any desired L/D ratio.

An alternate grid of elements approximating a circle of diameter $D=8.20$ is provided by 61 hexagonal elements with centers having x-y coordinates as listed in Table 4b. The elements are tightly arranged in a hexagonal array. The hexagonal elements each have opposite sides separated by a distance of 1. The x-y coordinates of this array may be also scaled as necessary to approximate an aperture with any specified diameter to obtain a cavity with any desired L/D ratio.

It will be obvious to those skilled in the art that the grid arrays of Tables 4a and 4b are arbitrary approximations to a circular aperture, and that similar results will be obtained by substituting any other grid of elements that approximate the aperture's shape. Further, the modifications necessary to approximate non-circular apertures are equally obvious to those skilled in the art.

It has been found that the cavity shapes which result from a numerical integration with respect to a grid of 57 squares based on Table 4a are in close agreement to those which are computationally based on a hexagonal grid of 61 elements based on Table 4b. It is not the particular grid which determines the inventive cavity shape, but the size of the aperture being approximated by the grid. Two other grids have been useful for this invention. The seven innermost points of Table 4b, $(0,0)$, $(0,\pm 1)$, $(\pm 0.5\sqrt{3}, \pm 0.5)$ have been used to obtain approximate results with a Hewlett Packard Model 41C handheld calculator. The twenty-one innermost points of Table 4a, $(0,0)$, $(0,\pm 1)$, $(\pm 1,0)$, $(0,\pm 2)$, $(\pm 2,0)$, $(\pm 1,\pm 1)$, $(\pm 1,\pm 2)$, $(\pm 2,\pm 1)$, have been used to obtain cavity shapes that are in close agreement to those based on all 57 points of Table 4a.

The embodiments of the invention based on a numerical integration over the aperture result in a cavity surface having an axial cross-section with the general appearence of the curve of FIG. 4A. As previously mentioned, in determining a particular cavity shape, one parameter is the apex angle $A_0$. For the inventive finite aperture cavity shapes, another parameter is D, the aperture diameter, or more precisely the L/D ratio. Since the normal form for describing the inventive cavity shapes has $L=1$, an aperture diameter D allows direct conversion to the corresponding L/D ratio.

Once $A_0$ and D have been specified, the following method may be used to determine a cavity shape in which the projected solid angle over the aperture 102 with respect to points on the cavity surface 106 is constant.

As before, it is assumed that the axis of symmetry has length $L=1$. It can be proved that a spherical cavity with diameter $[1+(\sin(A_o))(D^2/4)]/\sqrt{\sin(A_o)}$ having a circular aperture of diameter D will have a projected solid angle of its aperture with respect to all points on the cavity surface that is identical to the projected solid angle of the same aperture with respect to a conical apex opposite the aperture at $z=1$ with half angle $A_0$.

Further, it can be proved that the projected solid angle of an aperture on a spherical cavity with respect to any point on the cavity surface is constant. In other words, spherical shaped cavities may be considered to be a limiting case for the inventive cavity shapes as $A_0$ approaches 90 degrees.

The importance of these observations are that, given a conical apex at $z=1$, a first portion 401 of the cavity surface near the aperture 102 may be defined by a sphere 400 with diameter $[1+(\sin(A_o))(D^2/4)]/\sqrt{\sin(A_o)}$. The projected solid angle of the aperture with respect to any point on this first subsurface 401 will be the same as is at a conical apex at $z=1$ with half angle $A_0$.

Numerical techniques are used, in a manner similar to that described earlier with respect to the small aperture embodiments, to incrementally extend the conical apex from $z=1.00$ toward $z=0$. Unlike the small aperture embodiments, for each z value for which an r value will be determined, a numerical integration over the aperture surface must be performed. Nevertheless, the numerical approximation techniques to determine successive cross-sectional radii and tangents for decreasing z values is straightforward, although computationally lengthy.

More specifically, at $z=1.00$, $r=0$, Equation 1 can be used to determine the projected solid angle of the aperture at the apex by summing over the elements in the grid rather than integrating over $S_2$, with the integrand of Equation 1 determined for each grid point, and with $dS_2$ replaced by the area of each element. A straightforward computation allows a determination of $A_1$, $A_2$, and d for each grid element with respect to the apex.

The tangent at the apex can be extended until it intersects the line perpendicular to the axis of symmetry at $z=0.99$, or whatever z value close to the apex for which the cross-sectional radius is next to be computed. Using $A_0$ as a first approximation for determining the r value at this second Z value, by standard interpolation and iterative techniques similar to those described earlier, the finite sum version of Equation 1 may be solved to determine corresponding $A'_1$ and r values for the chosen z value such that the projected solid angle of the aperture remains the same as it was at the apex.

The process may be continued step by step for $z=1.00$ toward $z=0$, thereby defining a second subsurface 402 of the cavity which extends the conical apex in a manner to hold constant the projected solid angle of the aperture 102 with respect to each point on this second subsurface 402.

For each finite aperture cavity shape embodiment which has been determined by this numerical integration techinque, there is a point X on this second subsurface 402 which for most practical cavities has a z value between $z=0.50$ and $z=0.20$, in which the tangent 403 of the cavity surface at this point intersects the rim of the aperture. When this occurs, the second subsurface 402 of the cavity surface cannot be further continued since to continue it would define a cavity shape in which previously defined portions of the second cavity subsurface 402 would not be in direct line of sight of all of the aperture. Such an occurance would violate the conditions of determination of the previous points where it was assumed those previous points were in direct line of sight of the entire aperture.

A third subsurface 404 of the finite aperture cavity surface embodiment joins the second subsurface 402 to the first subsurface 401, thereby completing the cavity shape. It is determined in the following way. At point X on the second subsurface 402, a line 405 is drawn which intersects the rim of the aperture at a point opposite the point on the aperture at which the tangent 403 to subsurface 402 at X intersects the aperture. This line 405 is assumed to approximate a tangent to the third subsurface 404 at X in which the third subsurface 404 is moving away from the aperture.

This tangent 405 is used to define an initial guess of a small portion of the third subsurface 404. A point on this line 405 is chosen near X to define an initial guess for a new value of z and r. An appropriate tangent at this point is then calculated by the previously discussed numerical integration and approximation techniques.

An average tangent is then calculated which is half way between the tangent just calculated and the initial guess tangent 405. This average tangent is then used in place of tangent 405 to find a second guess value of z and r. From the new z and r a new calculated tangent is determined. By iteration, final values of z and r are found. The point X is the last point on subsurface 402 and the first point on subsurface 404. The point (z,r) just found is the second point on subsurface 404. Successive points on subsurface 404 are then determined the way successive points on subsurface 402 were found.

This process continues until the third subsurface 404 intersects the first subsurface 401. The curve of FIG. 4A is illustrative of the resulting cavity cross-section for such a "three surface" finite aperture embodiment. For many parameter combinations of $A_o$ and L/D that are of practical interest, the tangent to subsurface 404 is approximately perpendicular to the axis of rotational symmetry 104 at the point where subsurface 404 intersects the first subsurface 401. Table 5 lists the z and r values for such a "three surface" finite aperture embodiment in which $A_0=45°$ and D=0.1 (with L=1, of course).

Although the method described to determine a finite aperture cavity shape embodiment results in a cavity shape in which the projected solid angle of the aperture is constant with respect to any point on the cavity surface, there is a disadvantage to these "three surface" finite aperture embodiments in that the maximum radial cross-section may approach that of the sphere used to define the first subsurface 401. Although the embodiments are shorter than the sphere, it would also be desirable to reduce the maximum cross-sectional radius, thereby reducing the size, weight, and cost of the resulting black body simulator.

The simplest approach to obtaining a more commercially practical finite aperture cavity shape is to relax the requirement that the aperture's projected solid angle be constant with respect to all points on the cavity surface. By requiring the projecting solid angle to be constant only over a cavity's primary radiating surface, significant economics may be obtained. It is believed that such a requirement will not seriously affect the high uniform emissivity of a blackbody with a cavity so simplified since the devices receiving the radiation emitted from the aperture will not be in the line of sight of the cavity portions in which the projected solid angle is not held constant.

Figure 4B:
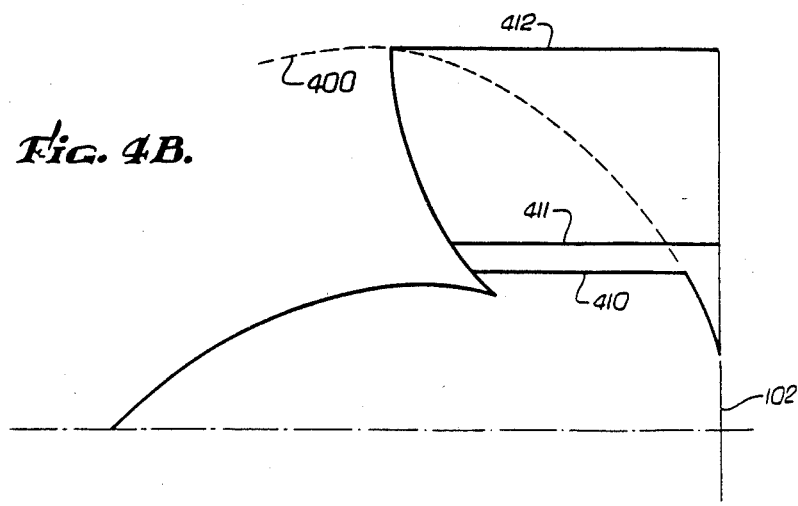

FIG. 4B illustrates several simplifications of the cavity shape of FIG. 4A. In each such cavity shape, it is assumed that there is no material deviation from the cavity shape of FIG. 4A over the primary radiating surface.

Line 410 provides a cavity in which the cavity shape of FIG. 4A is merely truncated beyond a certain maximum radius. This results in a cavity having a cylindrical portion between the first and second subsurfaces of FIG. 4A.

Line 411 truncates the curve of FIG. 4A at a maximum cross-sectional radius, which is extended to the plane of the aperture, thereby resulting in a cavity in which the cavity portion near the aperture is cylindrical with the aperture on the axial end of the cylinder.

Of course, rather than having a cavity shape with the previously described first subsurface 401 of FIG. 4A, the cavity may be extended in a cylindrical manner from a point on the third subsurface 404 to the plane formed by the aperture 102, as indicated by line 412. Such an embodiment may not materially reduce the maximum cross-sectional radius, but does offer economics in manufacturing since the curved first subsurface 401 of FIG. 4A is avoided.

Other simplifications to the finite aperture embodiments will be obvious to those skilled in the art. So long as the projected solid angle of the aperture with respect to the primary radiating surface is constant or approximately constant, the approximately uniform and high emissivity of the inventive cavity shapes will be assured.

Figure 4C:
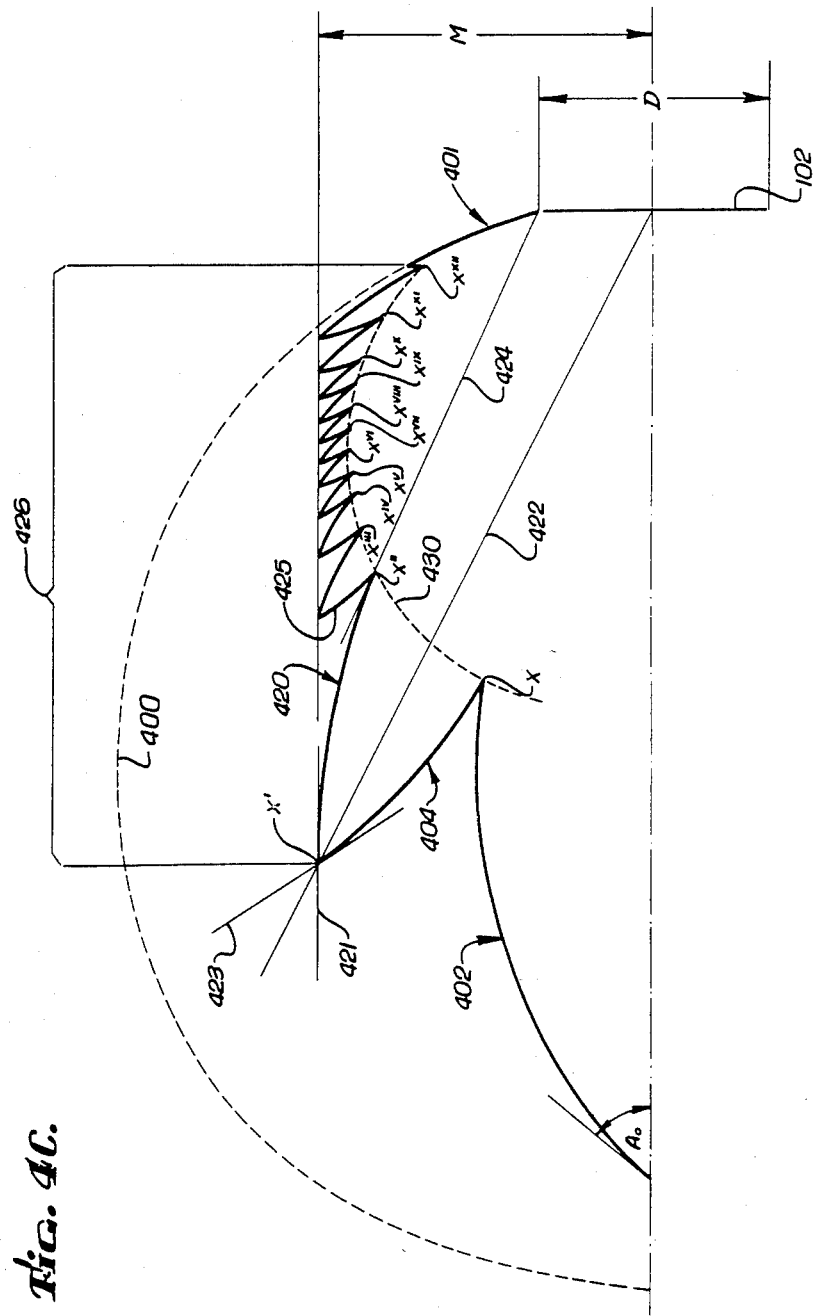

FIG. 4C illustrates one of a series of "Fresnel" embodiments of the inventive blackbody cavity shapes. The Fresnal embodiments are a variation on the finite aperture embodiments. Each Fresnel embodiment has as design parameters $A_0$, the apex half angle, D, the aperture diameter, and M, the maximum desired cross-sectional radius. For FIG. 4C, $A_o=50°$, D=0.25, and M=0.35.

A Fresnel cavity shape embodiment defines first 401 and second 402 subsurfaces in the same manner as a finite aperture embodiment with the same $A_0$ and D. The third subsurface 404 is extended only to point X', where r=M. At this point, a fourth subsurface 420 is determined which approaches z=0 again. The initial tangent 421 to the fourth subsurface 420 at X' may be satisfactorily approximated by ensuring that the tangent 421 at X' forms the same angle with respect to a line 422 from X' to the center of the aperture 102 that the tangent 423 of subsurface 404 at X' forms with line 422.

This fourth subsurface 420 is continued in a similar manner as was done with the second subsurface 402 until it intersects the first subsurface 401 or its tangent 424, say at X", intersects the aperture. At X", a fifth subsurface 425 is defined in a manner analogous to the third subsurface 404.

This computational determination of subsurfaces continues until one of the subsurfaces intersects the first subsurface 401, resulting in a "Fresnel" version of a finite aperture embodiment in which the maximum cross-sectional radius is limited to a maximum value M, yet for which the projected solid angle of the aperture is constant with respect points on each of the subsurfaces.

The "tilted sawtooth" configuration of the Fresnel portion 426 of the cavity surface of FIG. 4C may be satisfactorily approximated by a threaded cavity shape which does not materially differ from the computed shape.

The tilted sawtooth configuration of the Fresnel portion 426 of the cavity surface of FIG. 4C and the threaded cavity shape which was mentioned as a variation to FIG. 4C suggest worthwhile variations to the cavity shapes shown in FIG. 4B. Lines 410, 411, and 412 of FIG. 4B provide cavity shapes with cylindrical parts. Those cylindrical parts might to be replaced by a tilted sawtooth, tilted thread design, or a more conventional thread design. Such replacements of the cylindrical parts might be performed with relatively small increases in complexity and with appreciable improvements in the approximation of these cavities to cavities which have the projected solid angle of the aperture a constant when viewed from all points on the cavity surface. FIG. 4C with $A_o=50°$, $D=0.25$ and $M=0.35$ is useful to describe the general class of Fresnel embodiments of the inventive blackbody cavity shapes. However, the relatively large areas of subsurfaces 404 and 420 tend to make this a less suitable design for most applications.

FIG. 4D shows a cross-section of a full cavity and core of a Fresnel embodiment. For FIG. 4D, $A_o=76.5°$, $D=0.385$ and $M=0.40$. Table 6 lists the corresponding coordinate values. The relatively large area of subsurface 402 and the relatively large value of D make this an attractive design for many applications.

FIG. 4C and 4D show that the sequence of points $X, X^{II}, X^{III}, \ldots X^V$ (for FIG. 4D) (or $X^{XII}$ for FIG. 4C) form an arch 430. As the parameter M varies, the X points move back and forth on this arch, but the arch, and especially its maximum distance from the axis of symmetry 104, remain approximately constant. This maximum distance of the arch from the axis of symmetry 104 is important in the selection of the value of M. If M is closer to this maximum distance of the arch from the axis of symmetry 104, there will be more and smaller "teeth" in the cavity cross-section, somewhat like FIG. 4C. If M is farther from this maximum distance of the arch from the axis of symmetry 104, there will be fewer and larger "teeth", more like FIG. 4D.

The maximum value of M is the distance from the axis of symmetry 104 to the place where subsurfaces 404 and 401 would intersect if they were not interrupted. The minimum value of M is the maximum distance of the arch from the axis of symmetry 104, because points inside the arch cannot have the same projected solid angle of the aperture as do the other points on the cavity wall surface. If such a small value of M is nevertheless desired, then a different embodiment of the inventive cavity could be employed according to FIG. 4B, where the projected solid angle of the aperture is maintained constant only where viewed from points on the primary radiating surface.

Thus, it is seen that the arch 430 and the sphere 400 define a region of subsurfaces. Additional examples of cavity subsurfaces within the region of subsurfaces are shown in FIGS. 5A-5F. These illustrate cross-sections of several embodiments of the invention having aperture half-angles less than 60°. In each of these embodiments, the cross-sectional curve of the cavity shape lies between a pair of inner and outer limiting curves, both of which lay within the region of subsurfaces.

Figure 5A:
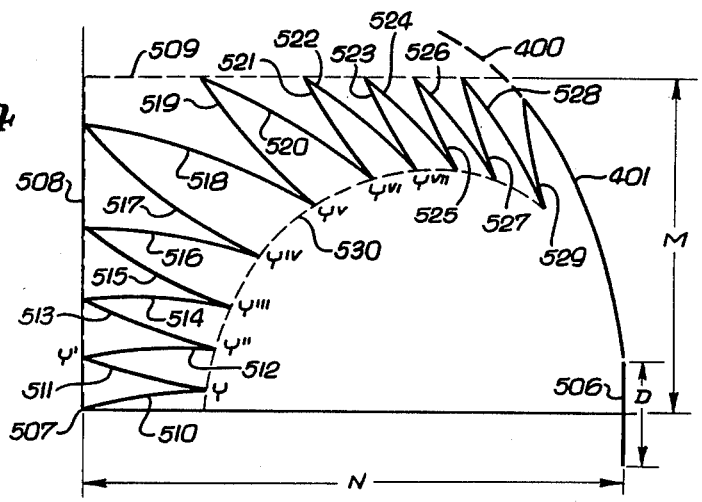
FIGS. 5A–5F illustrate cross-sections of several embodiments of the invention where multiple subsurfaces have cross-sections lying between several different alternative pairs of inner and outer limiting curves.

FIG. 5A shows a cross-section of a cavity shape embodiment having an apex half-angle of 13°. A first subsurface 510 extends from the apex 507 to the inner limiting curve which in this case is an arc 530 which is defined in a manner similar to that of arch 430 of FIG. 4C. Accordingly, a tangent to the surface 510 at point Y intersects the rim of the aperture 506.

A second subsurface 511 extends from the intersection of the surface 510 with the arch 530 at point Y to the outer limiting curve 508 which is a straight line passing through the apex 507 and perpendicular to the axis. The outer limiting curve 508 is placed a distance N of 1.0 from the plane of the aperture 506.

Extending from Y' (the point at which the subsurface 511 intersects the outer limiting line 508), a third subsurface 512 extends to the inner limiting curve 530 until the tangent to the subsurface 512 intersects the rim of the aperture as indicated at Y''. This computational determination of subsurfaces continues until subsurface 518 intersects the inner limiting curve 530. In order to reduce the overall width of the cavity, the next subsurface 519 extends from the inner limiting arch 530 to a second outer limiting curve 509 which is a straight line parallel to the axis at a distance M (which is 0.6 in this embodiment) from the axis of symmetry. The computational determination of the subsurfaces then continues in a manner similar to that described for FIG. 4C and 4D until one of the subsurfaces (subsurface 529) intersects the subsurface 401 described in connection with FIGS. 4A-4D. Each of the subsurfaces of the cavity of FIG. 5A are characterized by the fact that the projected solid angle of the aperture with respect to the subsurfaces remains constant from each point on the subsurfaces. Table 7 lists a representative set of z and r coordinates for the subsurfaces of the cavity of FIG. 5A.

Figure 5B:
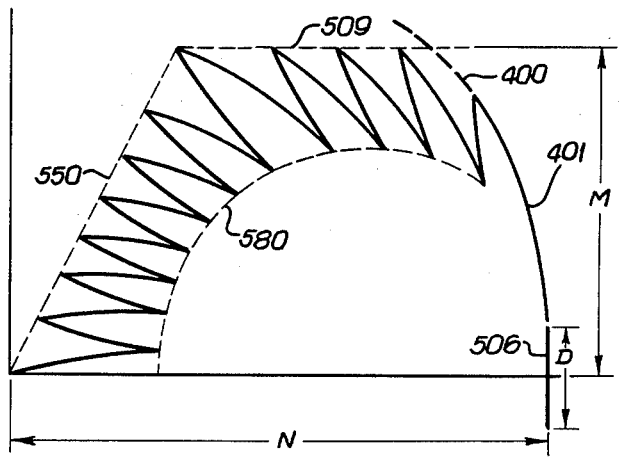

An alternative embodiment is shown in FIG. 5B, which resembles the embodiment shown in FIG. 5A except that the perpendicular outer limiting curve 508 of FIG. 5A is replaced by a slanted straight line outer limiting curve 550 which makes an arbitrary 63° angle with the perpendicular axis through the apex. The inner limiting curve 580 is also an arch similar to the arches 530 and 430 of FIG. 5A and 4C, respectively. Accordingly, the tangents to the subsurfaces at the arch 580 intersect the rim of the aperture 506. The remaining outer limiting curve is again the line 509 parallel to and spaced a distance of 0.6 from the axis of symmetry. The resulting subsurfaces are less deep and somewhat more uniform in cross-section than those shown in FIG. 5A. A representative set of coordinates for the subsurfaces of the cavity of FIG. 5B is listed in Table 8. This embodiment has an apex halfangle of 15°.

Figure 5C:
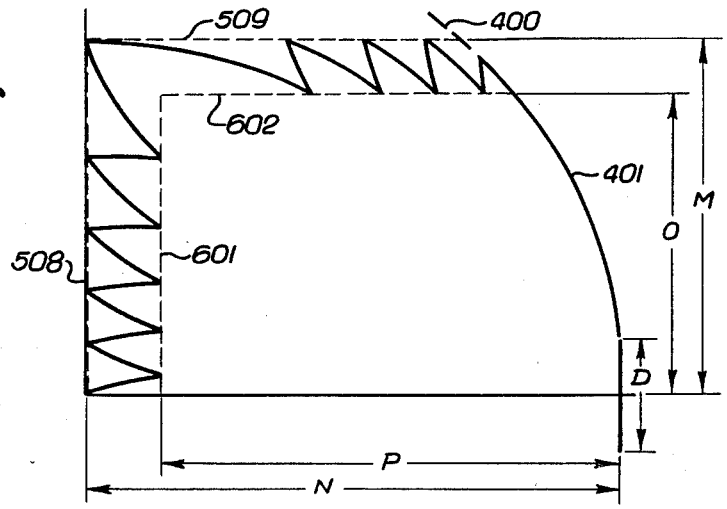

The cavity shape represented by the outline shown in FIG. 5C is also similar to that shown in FIG. 5A. Here however, the inner limiting arch 530 of FIG. 5A has been replaced by a pair of perpendicular lines 601 and 602 parallel to the outer limiting lines 508 and 509, respectively. The outer limiting line 509 is placed a distance of 0.65 from the axis of symmetry and the inner limiting line 602 is placed at a distance 0 of 0.55 from the axis. The other inner limiting line 601 is placed a distance P of 0.85 from the aperture. As seen in FIG. 5C, this embodiment may conveniently be fabricated with a backwall plate and sidewall cylinder as starting materials from which the subsurfaces may be machined. The embodiment of FIG. 5C has an apex half angle of 20°. Representative coordinates for the subsurfaces are listed in Table 9.

Figure 5D:
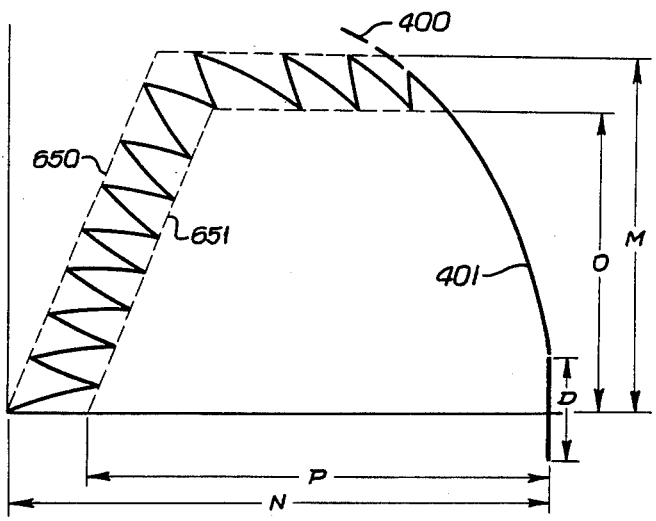
Figure 5E:
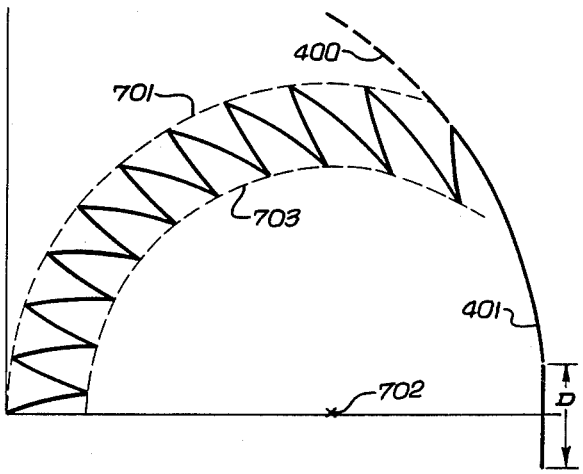
Figure 5F:
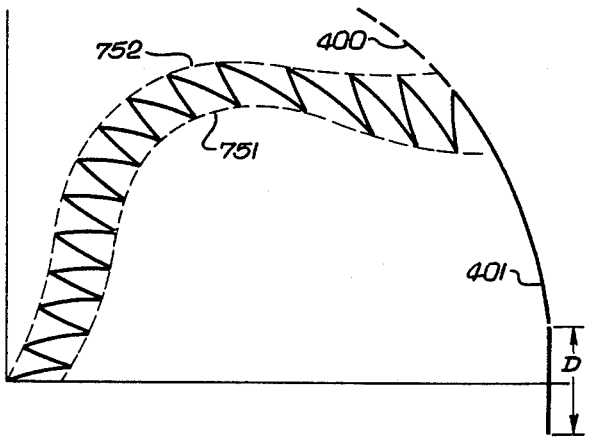

Combining elements of the previous three embodiments, FIG. 5D shows a cavity outline in which the inner and outer limiting curves 508 and 601 of FIG. 5C are replaced by slanted straight line inner and outer curves 650 and 651. The lines 650 and 651 are slanted at an angle of 68° with respect to the perpendicular. The apex half angle of the embodiment of FIG. 5D is 21°. Table 10 lists representative coordinates for the cross-sectional outline of this embodiment.

hows an embodiment having an outer limit-
1 defined by a circle having a radius of 0.6
r indicated at 702 which is at a distance of
aperture. The inner limiting curve 703 is
by a circle having a radius of 0.45 with the
702. The embodiment of FIG. 5E has an
gle of 20° and the subsurfaces are repre-
coordinate points listed in Table 11.
lows an embodiment which has inner and
curves 751 and 752 which are similar to
)3 and 701 of FIG. 5E except that a sine
ation has been added to the two circles.
it is seen that the inner and outer limiting
be arbitrarily selected to have any shape
gion of subsurfaces described above. The
of FIG. 5F has an aperture half angle of
absurfaces are represented by the coordi-
Table 12.
other embodiments, the construction of
hapes may be simplified by relaxing the
lat the aperture's projected solid angle be
ertain portions of the cavity surface. For
idewall of the cavity between the inner
ting curves 602 and 509 of FIG. 5C may
y a smooth cylinder or alternatively, a
g a uniform saw tooth cross-section. In
ylinder may extend beyond the sphere
n FIG. 4B, for example.
turing of blackbody simulators using the
ty shapes is conventional. Typical con-
involve a cylindrical steel, graphite or
)l as shown in FIG. 4D. Typical heating
e by the use of insulated nichrome wire
a spiral around nearly all of the curved
ndrical core. One or more temperature
ch as thermocouples or platinum resis-
eters will be fitted into narrow cylindri-
ich will open to the opposite face of the
le cavity aperture. Insulation 505 will be
s, and the entire assembly will be con-
propriate cylindrical or other shaped
with an opening provided to expose the
Insulation material and thickness will
by temperature requirements. Special
ermal insulation will be used for space
lator applications. A fan 504 may be
pposite end of the enclosure from the
ide cooling. A conventional tempera-
ontrols the electric power to the heat-
d on signals from a temperature sensor ious to those skilled in the art that the
ties of the inventive cavity shapes may
minor deviations from the previously
liments without departing from the
ention. For instance, although the de-
hapes are formed from one or more
g subsurfaces, a cavity having a cross-
y short line segments closely following
curving subsurfaces will result in a
ing perhaps only minor or theoretical
that of the computationally perfect
cordingly, the foregoing description
lustrative only and are not meant to
e invention, which is defined by the

TABLE 1

| | |
|---|---|
| $S_1$ | cavity surface |
| $s_1$ | point on $S_1$ |
| $S_2$ | surface having aperture as its perimeter |
| $s_2$ | point on $S_2$ |
| $(x, y)$ | coordinates of point on $S_2$ |
| $d = d(s_1, s_2)$ | distance between $s_1$ and $s_2$ |
| $z$ | point on axis of symmetry |
| | $z = 0$ at aperture |
| | $z = 1$ at apex |
| $r = r(z)$ | cross-sectional radius at $z$ |
| $A_0$ | apex half angle |
| $A_1$ | angle formed by the normal to $S_1$ at $s_1$, and the line between $s_1$ and $s_2$ |
| $A'_1$ | angle formed by the tangent to $S_1$ at $s_1$ and the axis of symmetry |
| $A_2$ | angle formed by normal to $S_2$ at $s_2$ and the line between $s_1$ and $s_2$ |
| $A'_2$ | aperture half angle |
| $D$ | diameter of aperture |
| $L$ | depth of the cavity |
| $M$ | specified maximum cross-sectional radius |
| $X$ | point on subsurface 402 where tangent intersects rim of aperture |
| $X'$ | point on subsurface 404 where $r = M$ |
| $X''$ | point on subsurface 420 where tangent intersects rim of aperture |
| $X'''$ | point on subsurface 427 where tangent intersects rim of aperture |

TABLE 2

| z | r | z | r |
|---|---|---|---|
| 1.00 | .000 | .50 | .100 |
| .95 | .026 | .45 | .096 |
| .90 | .047 | .40 | .090 |
| .85 | .065 | .35 | .083 |
| .80 | .078 | .30 | .074 |
| .75 | .089 | .25 | .063 |
| .70 | .096 | .20 | .052 |
| .65 | .101 | .15 | .040 |
| .60 | .102 689 | .10 | .027 |
| .59 | .102 839 | .05 | .013 531 |
| .58 | .102 899 | .04 | .010 836 |
| .57 | .102 871 | .03 | .008 133 |
| .56 | .102 755 | .02 | .005 425 |
| .55 | .102 553 | .01 | .002 713 |

SMALL APERTURE EMBODIMENT ($L = 1$, $A_o = 30°$)

TABLE 3

| $A_o$ (Apex Half Angle) | $A'_2$ (Aperture Half Angle) | z value For Maximum Cross-Sectional Radius | Maximum Cross-Sectional Radius |
|---|---|---|---|
| 7° | −3.5° | 0.58 | 0.024 |
| 13° | −6.5° | 0.58 | 0.044 |
| 20° | −10.1° | 0.58 | 0.068 |
| 25° | −12.6° | 0.58 | 0.085 |
| 30° | −15.2° | 0.58 | 0.103 |
| 45° | −23.2° | 0.58 | 0.159 |
| 60° | −31.8° | 0.58 | 0.221 |
| 88° | −57.5° | 0.56 | 0.404 |
| 89° | −61.7° | 0.55 | 0.428 |
| 90°* | −90.0° | 0.50* | 0.500* |

SUMMARY OF SMALL APERTURE EMBODIMENTS ($L = 1$)

*NOTE:
The $A_o = 90°$ data is calculated for a sphere which is the limiting case for large $A_o$.

TABLE 4a

| x | y | x | y | x | y | x | y | x | y |
|---|---|---|---|---|---|---|---|---|---|
| −4 | −1 | −3 | −2 | −2 | −3 | −1 | −4 | 0 | −4 |
| −4 | 0 | −3 | −1 | −2 | −2 | −1 | −3 | 0 | −3 |
| −4 | 1 | −3 | 0 | −2 | −1 | −1 | −2 | 0 | −2 |
| | | −3 | 1 | −2 | 0 | −1 | −1 | 0 | −1 |
| | | −3 | 2 | −2 | 1 | −1 | 0 | 0 | 0 |
| | | | | −2 | 2 | −1 | 1 | 0 | 1 |
| | | | | −2 | 3 | −1 | 2 | 0 | 2 |

TABLE 4a-continued

| x | y | x | y | x | y | x | y | x | y |
|---|---|---|---|---|---|---|---|---|---|
|   |   |   |   |   |   | −1 | 3 | 0 | 3 |
|   |   |   |   |   |   | −1 | 4 | 0 | 4 |
| 1 | −4 | 2 | −3 | 3 | −2 | 4 | −1 |   |   |
| 1 | −3 | 2 | −2 | 3 | −1 | 4 | 0 |   |   |
| 1 | −2 | 2 | −1 | 3 | 0 | 4 | 1 |   |   |
| 1 | −1 | 2 | 0 | 3 | 1 |   |   |   |   |
| 1 | 0 | 2 | 1 | 3 | 2 |   |   |   |   |
| 1 | 1 | 2 | 2 |   |   |   |   |   |   |
| 1 | 2 | 2 | 3 |   |   |   |   |   |   |
| 1 | 3 |   |   |   |   |   |   |   |   |
| 1 | 4 |   |   |   |   |   |   |   |   | x-y COORDINATES FOR THE CENTERS OF A GRID OF 57 SQUARES

TABLE 4b x-y COORDINATES FOR THE CENTERS OF A GRID OF 61 HEXAGONS

| x | y | x | y | x | y |
|---|---|---|---|---|---|
| $-2\sqrt{3}$ | −2 | $-1.5\sqrt{3}$ | −2.5 | $-\sqrt{3}$ | −3 |
| $-2\sqrt{3}$ | −1 | $-1.5\sqrt{3}$ | −1.5 | $-\sqrt{3}$ | −2 |
| $-2\sqrt{3}$ | 0 | $-1.5\sqrt{3}$ | −.5 | $-\sqrt{3}$ | −1 |
| $-2\sqrt{3}$ | 1 | $-1.5\sqrt{3}$ | .5 | $-\sqrt{3}$ | 0 |
| $-2\sqrt{3}$ | 2 | $-1.5\sqrt{3}$ | 1.5 | $-\sqrt{3}$ | 1 |
|   |   | $-1.5\sqrt{3}$ | 2.5 | $-\sqrt{3}$ | 2 |
|   |   |   |   | $-\sqrt{3}$ | 3 |
| $-.5\sqrt{3}$ | −3.5 | 0 | −4 | $.5\sqrt{3}$ | −3.5 |
| $-.5\sqrt{3}$ | −2.5 | 0 | −3 | $.5\sqrt{3}$ | −2.5 |
| $-.5\sqrt{3}$ | −1.5 | 0 | −2 | $.5\sqrt{3}$ | −1.5 |
| $-.5\sqrt{3}$ | −.5 | 0 | −1 | $.5\sqrt{3}$ | −.5 |
| $-.5\sqrt{3}$ | .5 | 0 | 0 | $.5\sqrt{3}$ | .5 |
| $-.5\sqrt{3}$ | 1.5 | 0 | 1 | $.5\sqrt{3}$ | 1.5 |
| $-.5\sqrt{3}$ | 2.5 | 0 | 2 | $.5\sqrt{3}$ | 2.5 |
| $-.5\sqrt{3}$ | 3.5 | 0 | 3 | $.5\sqrt{3}$ | 3.5 |
|   |   | 0 | 4 |   |   |
| $\sqrt{3}$ | −3 | $1.5\sqrt{3}$ | −2.5 | $2\sqrt{3}$ | −2 |
| $\sqrt{3}$ | −2 | $1.5\sqrt{3}$ | −1.5 | $2\sqrt{3}$ | −1 |
| $\sqrt{3}$ | −1 | $1.5\sqrt{3}$ | −.5 | $2\sqrt{3}$ | 0 |
| $\sqrt{3}$ | 0 | $1.5\sqrt{3}$ | .5 | $2\sqrt{3}$ | 1 |
| $\sqrt{3}$ | 1 | $1.5\sqrt{3}$ | 1.5 | $2\sqrt{3}$ | 2 |
| $\sqrt{3}$ | 2 | $1.5\sqrt{3}$ | 2.5 |   |   |
| $\sqrt{3}$ | 3 |   |   |   |   |

TABLE 5

| z | r | $A'_1$ | z | r | $A'_1$ |
|---|---|--------|---|---|--------|
| 1.000 | .000 | 45.00° | .370 | .134443 | 153.50° |
| .950 | .044 | 37.20 | .390 | .144 | 152.41 |
| .900 | .077 | 30.53 | .408 | .154 | 151.21 |
| .850 | .103 | 24.62 | .489 | .204 | 145.03 |
| .800 | .123 | 19.27 | .553 | .254 | 138.66 |
| .750 | .138 | 14.36 | .604 | .304 | 132.14 |
| .700 | .149 | 9.83 | .644 | .354 | 125.44 |

TABLE 5-continued

| z | r | $A'_1$ | z | r | $A'_1$ |
|---|---|--------|---|---|--------|
| .650 | .156 | 5.61 | .675 | .404 | 118.51 |
| .600 | .159006 | 1.69 | .698 | .454 | 111.25 |
| .590 | .159236 | .94 | .714 | .504 | 103.51 |
| .580 | .159335 | .20 | .722 | .554 | 95.05 |
| .570 | .159307 | −.53 | .723 | .564 | 93.24 |
| .560 | .159151 | −1.25 | .723 | .574 | 91.38 |
| .550 | .158871 | −1.96 | .723628 | .584443 | 89.47° |
| .500 | .156 | −5.34 | \multicolumn{3}{l}{SUBSURFACE 404} |
| .450 | .150 | −8.46 | \multicolumn{3}{l}{Subsurface 401 is a portion of} |
| .400 | .141 | −11.30 | \multicolumn{3}{l}{a sphere of radius .596 centered} |
| .390 | .139 | −11.83 | \multicolumn{3}{l}{at z = .594, r = o.0.} |
| .380 | .137 | −12.35 | \multicolumn{3}{l}{SUBSURFACE 401} |
| .370 | .134443 | −12.86° | | | |

SUBSURFACE 402

"THREE SURFACE" FINITE APERTURE EMBODIMENT ($A_o = 45°$, D = .1)

TABLE 6

| z | r | z | r | z | r |
|---|---|---|---|---|---|
| 1.000 | .000 | .467222 | .400008 | .257074 | .4000005 |
| .950 | .116 | .457 | .398 | .237 | .387 |
| .900 | .180 | .407 | .386 | .217 | .373 |
| .850 | .224 | .357 | .369 | .197 | .358 |
| .750 | .281 | .307 | .347 | .183261 | .346611 |
| .700 | .299 | .300924 | .344144 | | |
| .650 | .311 | SUBSURFACE 420 | | SUBSURFACE 429 | |
| .600 | .317133 | .300924 | .344114 | .183261 | .346611 |
| .590 | .317852 | .306 | .354 | .186 | .357 |
| .580 | .318382 | .311 | .364 | .192 | .377 |
| .570 | .318724 | .316 | .374 | .196 | .397 |
| .560 | .318882 | .325 | .394 | .196071 | .400000 |
| .550 | .318856 | .326748 | .400008 | | |
| .540 | .318648 | SUBSURFACE 425 | | SUBSURFACE 430 | |
| .530 | .318261 | .326748 | .400008 | .196071 | .400000 |
| .520 | .317695 | .307 | .390 | .176 | .384 |
| .510 | .316953 | .287 | .380 | .156 | .366 |
| .500 | .316035 | .267 | .369 | .136 | .347 |
| .450 | .309 | .247 | .356 | .126 | .336 |
| .420 | .303 | .239917 | .351695 | .112448 | .321363 |
| .410 | .300 | SUBSURFACE 427 | | SUBSURFACE 431 | |
| .404 | .298554 | .239917 | .351695 | .112448 | .321363 |
| SUBSURFACE 402 | | .244 | .362 | .116 | .341 |
| .404146 | .298554 | .251 | .382 | .117 | .361 |
| .412 | .309 | .255 | .392 | .117212 | .381363 |
| .446 | .359 | .257074 | .400005 | | |
| .467222 | .400008 | SUBSURFACE 428 | | SUBSURFACE 432 | |
| SUBSURFACE 404 | | | | | |

Subsurface 401 is a sphere of radius .525 centered at z = .489, r = 0.0

FRESNEL CAVITY SHAPE EMBODIMENT ($A_o = 76.5°$, D = .385, M = .40)

TABLE 7

| z | r | z | r |
|---|---|---|---|
| 1.000 | 0.000 | .591 | .600 |
| .890 | .021 | .481 | .523 |
| .758 | .037 | .379 | .439 |
| .894 | .067 | .431 | .519 |
| .995 | .097 | .476 | .600 |
| .865 | .108 | .386 | .520 |
| .746 | .111 | .306 | .438 |
| .870 | .151 | .348 | .518 |
| .992 | .201 | .384 | .600 |
| .842 | .199 | .304 | .513 |
| .719 | .188 | .232 | .421 |
| .853 | .248 | .268 | .511 |
| .993 | .328 | .295 | .600 |
| .813 | .307 | .215 | .491 |
| .668 | .275 | .147 | .376 |
| .812 | .365 | .177 | .496 |
| .989 | .515 | .187 | .600 |
| .769 | .460 | | |
| .562 | .375 | | |
| .680 | .485 | | |
| .778 | .600 | | |
| .598 | .513 | | |

TABLE 7-continued

| z | r | z | r |
|---|---|---|---|
| .459 | .424 | | |
| .531 | .514 | | |

EMBODIMENT OF FIG. 5A

A portion of a circle of radius 1.054 extends from the last point to the edge of the aperture to define subsurface 401. The center of the circle is on an extension of the axis 1.049 from the aperture and 0.049 out past the apex. The radius of the aperture is 0.1 for an L/R ratio of 10:1. The apex half-angle is 13.

TABLE 8

| z | r | z | r |
|---|---|---|---|
| 1.000 | 0.000 | .658 | .401 |
| .860 | .030 | .741 | .481 |
| .722 | .046 | .621 | .434 |
| .846 | .076 | .505 | .376 |
| .939 | .106 | .593 | .466 |
| .819 | .116 | .692 | .596 |
| .708 | .116 | .552 | .522 |
| .798 | .146 | .397 | .414 |
| .895 | .186 | .461 | .504 |
| .785 | .184 | .516 | .600 |
| .687 | .176 | .416 | .523 |
| .757 | .206 | .307 | .420 |
| .857 | .256 | .355 | .509 |
| .757 | .246 | .393 | .600 |
| .660 | .230 | .303 | .508 |
| .752 | .280 | .218 | .401 |
| .831 | .330 | .252 | .491 |
| .721 | .308 | .281 | .600 |
| .621 | .282 | .201 | .493 |
| .698 | .332 | .113 | .338 |
| .789 | .402 | .126 | .398 |
| .679 | .371 | .137 | .518 |
| .571 | .331 | | |

EMBODIMENT OF FIG. 5B

A portion of a circle of radius 0.985 extends from the last point to the edge of the aperture to define subsurface 401. The center of the circle is on the axis a distance 0.980 from the aperture in the direction of the apex. The radius of the aperture is 0.1 for an L/R ratio of 10:1. The apex half-angle is 15°.

TABLE 9

| z | r | z | r |
|---|---|---|---|
| 1.000 | 0.000 | .919 | .517 |
| .933 | .022 | .990 | .644 |
| .850 | .042 | .782 | .623 |
| .926 | .068 | .575 | .550 |
| .992 | .096 | .603 | .603 |
| .913 | .113 | .623 | .650 |
| .848 | .123 | .525 | .602 |
| .930 | .160 | .442 | .550 |
| .991 | .195 | .465 | .605 |
| .911 | .205 | .479 | .651 |
| .849 | .209 | .405 | .600 |
| .910 | .245 | .343 | .549 |
| .990 | .304 | .359 | .607 |
| .880 | .308 | .367 | .650 |
| .848 | .307 | .313 | .605 |
| .911 | .357 | .258 | .550 |
| .990 | .438 | .262 | .569 |
| .921 | .438 | .266 | .629 |
| .849 | .432 | | |

EMBODIMENT OF FIG. 5C

A portion of a circle of radius 0.858 extends from the last point to the edge of the aperture to define subsurface 401. The center of the circle is on the axis a distance 0.852 from the aperture in a direction toward the apex. The radius of the aperture is 0.1 for an L/R ratio 10:1. The apex half-angle is 20°.

TABLE 10

| z | r | z | r |
|---|---|---|---|
| 1.000 | 0.000 | .694 | .385 |
| .915 | .028 | .750 | .442 |
| .829 | .049 | .793 | .495 |
| .895 | .071 | .734 | .482 |
| .952 | .096 | .663 | .462 |
| .873 | .111 | .711 | .526 |
| .800 | .121 | .753 | .597 |
| .864 | .149 | .686 | .577 |
| .919 | .177 | .611 | .550 |
| .850 | .184 | .635 | .593 |
| .774 | .187 | .659 | .650 |
| .835 | .220 | .558 | .608 |
| .889 | .254 | .455 | .549 |
| .819 | .255 | .475 | .595 |
| .747 | .252 | .492 | .650 |
| .806 | .290 | .417 | .602 |
| .858 | .331 | .350 | .550 |
| .778 | .325 | .366 | .608 |
| .723 | .317 | .373 | .651 |
| .777 | .361 | .311 | .601 |
| .828 | .409 | .258 | .549 |
| .768 | .401 | .265 | .618 |

EMBODIMENT OF FIG. 5D

A portion of a circle of radius 0.838 extends from the last point to the edge of the aperture to define subsurface 401. The center of the circle is on the axis a distance 0.832 from the aperture measured in a direction toward the apex. The radius of the aperture is 0.1 for an L/R ratio of 10:1. The apex half-angle is 21°.

TABLE 11

| z | r | z | r |
|---|---|---|---|
| 1.000 | 0.000 | .708 | .433 |
| .924 | .024 | .606 | .400 |
| .846 | .043 | .653 | .451 |
| .922 | .069 | .705 | .517 |
| .993 | .100 | .611 | .482 |
| .925 | .114 | .512 | .435 |
| .830 | .128 | .560 | .499 |
| .903 | .161 | .600 | .566 |
| .967 | .197 | .503 | .515 |
| .878 | .206 | .405 | .449 |
| .798 | .208 | .440 | .510 |
| .867 | .248 | .479 | .595 |
| .926 | .289 | .382 | .525 |
| .836 | .289 | .286 | .435 |
| .751 | .282 | .316 | .509 |
| .816 | .328 | .341 | .597 |
| .870 | .375 | .250 | .505 |
| .771 | .364 | .156 | .377 |
| .685 | .346 | .169 | .426 |
| .745 | .399 | .181 | .535 |
| .796 | .452 | | |

EMBODIMENT OF FIG. 5E

A portion of a circle of radius 0.858 extends from the last point to the edge of the aperture to define subsurface 401. The center of the circle is located on the axis a distance 0.852 from the aperture measured in a direction toward the apex. The radius of the aperture is 0.1 for an L/R ratio of 10:1. The apex half-angle is 20°.

TABLE 12

| z | r | z | r |
|---|---|---|---|
| 1.000 | 0.000 | .771 | .456 |
| .943 | .188 | .717 | .443 |
| .879 | .357 | .750 | .480 |
| .927 | .051 | .779 | .518 |
| .973 | .070 | .711 | .501 |
| .915 | .083 | .654 | .482 |
| .846 | .095 | .679 | .514 |

TABLE 12-continued

| z | r | z | r |
|---|---|---|---|
| .902 | .118 | .707 | .557 |
| .943 | .137 | .632 | .530 |
| .884 | .146 | .570 | .502 |
| .820 | .152 | .597 | .544 |
| .874 | .177 | .618 | .581 |
| .922 | .204 | .528 | .536 |
| .862 | .208 | .442 | .482 |
| .804 | .209 | .467 | .526 |
| .856 | .239 | .489 | .572 |
| .906 | .272 | .399 | .509 |
| .856 | .272 | .323 | .444 |
| .794 | .270 | .353 | .508 |
| .852 | .309 | .371 | .556 |
| .891 | .340 | .305 | .495 |
| .841 | .338 | .237 | .420 |
| .781 | .332 | .257 | .476 |
| .820 | .363 | .277 | .556 |
| .867 | .407 | .224 | .495 |
| .807 | .400 | .169 | .419 |
| .758 | .392 | .177 | .458 |
| .794 | .426 | .184 | .540 |
| .830 | .467 | | |

EMBODIMENT OF FIG. 5F

A portion of a circle of radius 0.858 extends from the last point of the table to the edge of the aperture to define subsurface 401. The center of this circle is on the axis a distanc 0.852 from the aperture measured in the direction toward the apex. The radius of the aperture is 0.1 for an L/R ratio of 10:1. The apex half-angle is 20°.

I claim:

1. A blackbody simulator, comprising:

a core with a first side;

the core having an aperture on its first side to a cavity, the cavity being rotationally symmetrical about an axis and having a cone-like apex on the axis opposite the aperture with an apex half-angle of less that 60°; the cavity surface being shaped so that the value of the projected solid angle of the aperture with respect to any point on the cavity surface is generally constant;

the cavity having n subsurfaces with the $n^{th}$ subsurface having the shape of a portion of a sphere;

the cavity subsurfaces defining inner and outer limiting curves with each subsurface up to the $(n-1)^{th}$ subsurface arcuately extending from the inner limiting curve to the outer limiting curve;

said outer limiting curve remaining inside the sphere defined by the $n^{th}$ subsurface and the inner limiting curve remaining outside an arch defined by the locations at which a tangent in a plane containing the axis of symmetry intersects the rim of the aperture for each subsurface if extended to the arch.

2. The simulator of claim 1, wherein a portion of the subsurfaces away from the axis of symmetry are replaced by a cylinder.

3. A blackbody simulator, comprising:

a core with a first side;

the core having an aperture on its first side to a cavity, the cavity being rotationally symmetrical about an axis and having a cone-like apex on the axis opposite the aperture, the cavity surface shaped so that the value of the projected solid angle of the aperture with respect to any point on the cavity surface is generally constant, and the cavity having n subsurfaces;

the first subsurface arcuately extending from the apex toward the aperture to a circular junction with a second subsurface at which place a tangent to the first subsurface in a plane containing the axis of symmetry intersects the rim of the aperture;

the second subsurface arcuately extending from the junction with the first subsurface to a circular junction with a third subsurface at which junction the distance of points on the second subsurface from a plane defined by the aperture reaches a specified maximum value N;

the third subsurface arcuately extending from the circular junction with the second subsurface toward the aperture to a circular junction with a fourth subsurface at which junction a tangent to the third subsurface in a plane containing the axis of symmetry intersects the rim of the aperture;

a fourth, fifth, sixth, seventh, up to $n^{th}$ subsurface continuing until the $(n-1)^{th}$ subsurface intersects the $n^{th}$ subsurface, said $n^{th}$ subsurface arcuately extending from the rim of the aperture, and said $n^{th}$ subsurface having the shape of a portion of a sphere;

said n being an integer from 5 to about 1,000, said fourth, sixth, up to $r^{th}$ subsurface arcuately extending from the circular junction with the previous subsurface to a circular junction with the next subsurface at which junction the distance of points on said fourth, sixth, up to $r^{th}$ subsurface from the aperture plane reaches the same specified maximum value N, as that specified for the second subsurface;

the $(r+2)^{th}$, $(r+4)^{th}$, up to $(n-1)^{th}$ subsurface arcuately extending from the circular junction with the previous subsurface to a circular junction with the next subsurface at which junction the distance of points on said $(r+2)^{th}$, $(r+4)^{th}$, up to $(n-1)^{th}$ subsurface from the axis of symmetry reaches a specified maximum value M;

said r being an integer from 4 to about 1,000, said third, fifth, seventh, up to $m^{th}$ subsurface arcuately extending from the circular junction with the previous subsurface to a circular junction with the next subsurface at which junction a tangent to said third, fifth, seventh, up to $m^{th}$ subsurface in a plane containing the axis of symmetry intersects the rim of the aperture; and said m being an integer from 3 to about 1,000.

4. A blackbody simulator, comprising:

a core having a first side;

the core further having a cavity and an aperture on its first side to the cavity, the cavity being rotationally symmetrical about an axis and having a cone-like apex on the axis opposite the aperture with an apex half-angle of less than 60° the cavity surface being shaped so that the value of the projected solid angle of the aperture with respect to any point on the cavity surface is substantially constant;

the cavity surface comprising n subsurfaces;

the first subsurface extending from the apex toward the aperture to a circular junction with the second subsurface;

the $n^{th}$ subsurface extending from the rim of the aperture, and said $n^{th}$ subsurface having the shape of a portion of a sphere;

said n being an integer from 5 to about 1,000;

the cavity subsurfaces defining inner and outer limiting curves with each subsurface up to the $(n-1)^{th}$ subsurface extending from the inner limiting curve to the outer limiting curve;

said outer limiting curve remaining inside the sphere defined by the n$^{th}$ subsurface and the inner limiting curve remaining outside an arch defined by the locations at which a tangent in a plane containing the axis of symmetry intersects the rim of the aperture for each subsurface if extended to the arch.

5. For use in a system requiring electromagnetic radiation to be radiated onto a utilization object, a blackbody simulator having a cavity defining an apex and a cavity surface, and an aperture to the cavity, said cavity surface being divided into a primary radiating surface and a secondary radiating surface, the primary radiating surface comprising portions of the cavity surface which are in direct line of sight to some portion of the utilization object through the aperture, the secondary radiating surface comprising portions of the cavity surface which are not part of the primary radiating surface;

wherein the projected solid angle of the aperture with respect to substantially all portions of the primary radiating surface is substantially constant; and the primary radiating surface comprises a flat circular plate having concentric circular grooves, and the secondary radiating surface comprises a cylinder and a flat disc aperture plate.

6. A blackbody simulator comprising:

a core having a first side;

the core further having a cavity and an aperture on its first side to the cavity, the cavity being rotationally symmetrical about an axis and having a cone-like apex on the axis opposite the aperture with an apex half-angle of less than 60°, a substantial portion of the cavity surface being shaped so that the value of the projected solid angle of the aperture with respect to any point on the cavity surface portion is substantially constant;

the cavity surface portion comprising at least n subsurfaces;

the first subsurface extending from the apex toward the aperture;

said n being an integer from 5 to about 1,000;

a substantial number of said cavity portion subsurfaces defining inner and outer limiting curves with each of said substantial number of subsurfaces extending from the inner limiting curve to the outer limiting curve;

said outer limiting curve remaining inside a sphere containing the rim of the aperture and having a radius such that the value of the projected solid angle of the aperture with respect to any point of the sphere is substantially constant, and said inner limiting curve remaining outside an arch defined by the locations at which a tangent in a plane containing the axis of symmetry intersects the rim of the aperture for each subsurface if extended to the arch.

7. For use in a system requiring electromagnetic radiation to be radiated onto a utilization object, a blackbody simulator having a cavity defining an apex and a cavity surface, and an aperture to the cavity, said cavity surface being divided into a primary radiating surface and a secondary radiating surface, the primary radiating surface comprising portions of the cavity surface which are in direct line of sight to some portion of the utilization object through the aperture, the secondary radiating surface comprising portions of the cavity surface which are not part of the primary radiating surface;

wherein the projected solid angle of the aperture with respect to all portions of the primary radiating surface is generally constant; and the primary radiating surface comprises a flat circular plate having concentric circular grooves.

8. A blackbody simulator according to claim 6 wherein the outer limiting curve comprises a straight line outer limiting curve passing through the apex and the inner limiting curve comprises a straight line inner limiting curve parallel to the straight line outer limiting curve.

9. The simulator of claim 6 or 8 wherein a second portion of the cavity surface away from the axis of symmetry is a substantially cylindrical surface.

10. A blackbody simulator according to claim 4 wherein the outer limiting curve comprises a first straight line outer limiting curve and a second straight line outer limiting curve;

and wherein the inner limiting curve includes an arch defined by the locations on the subsurfaces at which a tangent in a plane containing the axis of symmetry intersects the rim of the aperture for each subsurface;

said first straight line outer limiting curve passing through the apex and said second straight line outer limiting curve being parallel to the axis of symmetry and a distance M from said axis of symmetry.

11. A blackbody simulator according to claim 4 wherein the outer limiting curve comprises a first straight line outer limiting curve and a second straight line outer limiting curve;

and wherein the inner limiting curve comprises a first straight line inner limiting curve and a second straight line inner limiting curve;

said first straight line outer limiting curve passing through the apex perpendicular to the axis of symmetry;

said second straight line outer limiting curve being parallel to the axis of symmetry and a distance M from said axis of symmetry;

said first straight line inner limiting curve being perpendicular to the axis of symmetry intersecting the axis of symmetry a distance P from the aperture;

said second straight line inner limiting curve being parallel to the axis of symmetry and a distance O from said axis of symmetry.

12. A blackbody simulator according to claim 4 wherein the outer limiting curve comprises a first straight line outer limiting curve and a second straight line outer limiting curve;

and wherein the inner limiting curve comprises a first straight line inner limiting curve and a second straight line inner limiting curve;

said first straight line outer limiting curve passing through the apex at an oblique angle;

said second straight line outer limiting curve being parallel to the axis of symmetry and a distance M from said axis of symmetry;

said first straight line inner limiting curve being parallel to the first straight line outer limiting curve and intersecting the axis of symmetry a distance P from the aperture;

said second straight line inner limiting curve being parallel to the axis of symmetry and a distance O from said axis of symmetry.

13. A blackbody simulator according to claim 4 wherein the inner and outer limiting curves are concentric circles with their center on the axis of symmetry.

14. A blackbody simulator according to claim 9 wherein the aperture defines a plane and the cylindrical surface extends to the plane of the aperture, and wherein the cavity has a third surface which is a plane surface in the plane of the aperture.

15. A blackbody simulator according to claim 5 wherein the cylindrical surface is threaded.

16. A blackbody simulator according to claim 14 wherein the cylindrical surface is threaded.

17. A blackbody simulator according to claim 8 wherein a second portion on the cavity surface has an axial crossection approximating a sawtooth shape.

18. A blackbody simulator according to claim 6 wherein a second portion of the cavity surface away from the axis of symmetry has an axial crossection approximating a sawtooth shape.

19. A blackbody simulator according to claim 7 wherein the secondary radiating surface comprises a cylinder and a subsurface arcuately extending from the rim of the aperture to the cylinder, said subsurface having the shape of a portion of a sphere, and said subsurface being shaped so that the value of the projected solid angle of the aperture with respect to any point on the subsurface is substantially equal to the value of the projected solid angle of the aperture with respect to points on the cavity primary radiating surface near the apex.

20. A blackbody simulator according to claim 5 wherein the cylinder has a threaded surface.

21. A blackbody simulator according to claim 19 wherein the cylinder has a threaded surface.

22. A blackbody simulator according to claim 5 wherein the cylinder has a surface which has an axial crossection which approximates a sawtooth shape.

23. A blackbody simulator according to claim 19 wherein the cylinder has a surface which has an axial crossection which approximates a sawtooth shape.

24. A blackbody simulator according to claim 4 or 11 wherein at least one subsurface comprises a plurality of subsurfaces having an axial cross-sectional shape of straight line segments.

25. A blackbody simulator according to claim 5 wherein at least one groove comprises a plurality of subsurfaces having an axial cross-sectional shape of straight line segments.

26. The simulator of claim 6, wherein a second portion of the cavity surface away from the axis of symmetry has the shape of a cylinder.

27. A blackbody simulator according to claim 6 for use in a system requiring electromagnetic radiation to be radiated onto a utilization object, wherein the cavity surface comprises a primary radiating surface and a secondary radiating surface, the primary radiating surface comprising all portions of the cavity surface which are in direct line of sight to some portion of the utilization object through the aperture;
and wherein said substantial portion of the cavity surface comprises said primary radiating surface.

28. The simulator of claim 27, wherein a portion of the secondary surface has a cylindrical shape.

29. A blackbody simulator according to claim 6 wherein the outer limiting curve comprises a first straight line outer limiting curve and a second straight line outer limiting curve;
and wherein the inner limiting curve includes an arch defined by the locations on the subsurfaces at which a tangent in a plane containing the axis of symmetry intersects the rim of the aperture for each subsurface;
said first straight line outer limiting curve passing through the apex and said second straight line outer limiting curve being parallel to the axis of symmetry.

30. A blackbody simulator according to claim 6 wherein the outer limiting curve comprises a first straight line outer limiting curve and a second straight line outer limiting curve;
and wherein the inner limiting curve comprises a first straight line inner limiting curve and a second straight line inner limiting curve;
said first straight line outer limiting curve passing through the apex perpendicular to the axis of symmetry;
said second straight line outer limiting curve being parallel to the axis of symmetry;
said first straight line inner limiting curve being perpendicular to the axis of symmetry; and
said second straight line inner limiting curve being parallel to the axis of symmetry.

31. A blackbody simulator according to claim 6 wherein the outer limiting curve comprises a first straight line outer limiting curve and a second straight line outer limiting curve;
and wherein the inner limiting curve comprises a first straight line inner limiting curve and a second straight line inner limiting curve;
said first straight line outer limiting curve passing through the apex at an oblique angle;
said second straight line outer limiting curve being parallel to the axis of symmetry;
said first straight line inner limiting curve being parallel to the first straight line outer limiting curve and intersecting the axis of symmetry; and
said second straight line inner limiting curve being parallel to the axis of symmetry.

32. A blackbody simulator according to claim 6 wherein the inner and outer limiting curves are concentric circles with their center on the axis of symmetry.

33. A blackbody simulator according to claim 27 wherein the outer limiting curve of the primary radiating surface comprising a straight line outer limiting curve passing through the apex at an oblique angle and the inner limiting curve of the primary radiating surface comprises a straight line inner limiting curve which is parallel to the first straight line outer limiting curve and intersects the axis of symmetry.

34. A blackbody simulator according to claim 33 wherein said secondary radiating surface comprises a cylindrical surface.

35. A blackbody simulator according to claim 34 wherein the aperture defines a plane and the cylindrical surface is extended to the plane of the aperture, and the secondary radiating surface further comprises a plane surface in the plane of the aperture.

36. A blackbody simulator according to claim 34 wherein the cylindrical surface is threaded.

37. A blackbody simulator according to claim 35 wherein the cylindrical surface is threaded.

38. A blackbody simulator according to claim 33 wherein a portion of the secondary radiating surface has an axial cross-section which approximates a sawtooth shape.

39. A blackbody simulator according to claim 27 wherein the primary radiating surface comprises a flat circular plate having concentric circular grooves.

40. A blackbody simulator according to claim 39 wherein the secondary radiating surface comprises a cylinder.

41. A blackbody simulator according to claim 40 wherein the secondary radiating surface further comprises a flat disc in the plane of the aperture.

42. A blackbody simulator according to claim 40 wherein the secondary radiating surface further comprises a subsurface arcuately extending from the rim of the aperture to the cylinder, said subsurface having the shape of a portion of a sphere, and said subsurface being shaped so that the value of the projected solid angle of the aperture with respect to any point on the spherical subsurface is substantially equal to the value of the projected solid angle of the aperture with respect to points on the cavity surface near the apex.

43. A blackbody simulator according to claim 40 wherein the cylinder has a threaded surface.

44. A blackbody simulator according to claim 39 wherein a portion of the secondary radiating surface has an axial crossection which approximates a sawtooth shape.

* * * * *